(12) United States Patent
Andrei

(10) Patent No.: US 6,618,719 B1
(45) Date of Patent: Sep. 9, 2003

(54) DATABASE SYSTEM WITH METHODOLOGY FOR REUSING COST-BASED OPTIMIZATION DECISIONS

(75) Inventor: Mihnea Andrei, Meudon (FR)

(73) Assignee: Sybase, Inc., Dublin, CA (US)

( * ) Notice: Subject to any disclaimer, the term of this patent is extended or adjusted under 35 U.S.C. 154(b) by 0 days.

(21) Appl. No.: 09/574,405

(22) Filed: May 19, 2000

Related U.S. Application Data

(60) Provisional application No. 60/134,826, filed on May 19, 1999.

(51) Int. Cl.[7] ............................. G06F 17/30; G06F 7/00
(52) U.S. Cl. ............................................. 707/2; 707/3
(58) Field of Search ................... 707/1–3, 10; 709/201

(56) References Cited

U.S. PATENT DOCUMENTS

| | | | |
|---|---|---|---|
| 4,956,774 A | 9/1990 | Shibamiya et al. ......... 364/200 |
| 5,384,893 A | 1/1995 | Hutchins ................... 395/2.76 |
| 5,495,605 A * | 2/1996 | Cadot ........................... 707/4 |
| 5,546,570 A * | 8/1996 | McPherson et al. ........... 707/4 |
| 5,552,995 A | 9/1996 | Sebastian ............... 364/468.03 |
| 5,689,696 A | 11/1997 | Gibbons et al. ............ 395/601 |
| 5,732,107 A | 3/1998 | Phillips et al. .............. 375/296 |
| 5,778,353 A | 7/1998 | Schiefer et al. ................ 707/2 |
| 5,799,311 A | 8/1998 | Agrawal et al. ............ 707/102 |
| 5,822,456 A | 10/1998 | Reed et al. .................. 382/232 |
| 5,822,747 A * | 10/1998 | Graefe et al. .................. 707/2 |
| 5,838,579 A | 11/1998 | Olson et al. ................ 364/488 |
| 5,903,476 A | 5/1999 | Mauskar et al. ............ 364/578 |
| 5,940,819 A * | 8/1999 | Beavin et al. .................. 707/2 |
| 6,003,022 A * | 12/1999 | Eberhard et al. ............... 707/2 |
| 6,012,054 A | 1/2000 | Seputis .......................... 707/3 |
| 6,275,818 B1 * | 8/2001 | Subramanian et al. ......... 707/2 |
| 6,353,826 B1 * | 3/2002 | Seputis .......................... 707/5 |
| 6,439,783 B1 * | 8/2002 | Antoshenkov ................. 707/3 |

* cited by examiner

Primary Examiner—Greta Robinson
Assistant Examiner—Susan Rayyan
(74) Attorney, Agent, or Firm—John A. Smart

(57) ABSTRACT

A database system providing a methodology, implemented as an "Abstract Plan on Disc" technology (referred to herein as, "Ariadne"), is described for turning cost based optimization decisions into stored, reusable items. In particular, the present invention provides a novel language interface to the optimizer, through an Abstract Plan, through which it can be given a description of the desired query execution plan (QEP). The language interface defines a declarative language syntax that allows description of the QEP. It does not specify the sequence of operations the database system's optimizer and code generator should accomplish to generate the QEP, but rather describes the desired outcome. Such an approach provides an abstraction barrier between an optimizer directives language and some specific optimizer and code generator. In this manner, the present invention allows a database system the ability to generate a better execution plan, and thereby realize better query performance. Such a feature has particular utility in avoiding performance regressions on server release upgrade and in query optimization fine tuning.

46 Claims, 3 Drawing Sheets

DATABASE SYSTEM WITH METHODOLOGY FOR REUSING COST-BASED OPTIMIZATION DECISIONS

RELATED APPLICATIONS

The present application is related to and claims the benefit of priority from commonly-owned U.S. provisional application Ser. No. 60/134,826, filed May 19, 1999, the disclosure of which (including any attachments and appendices thereof) is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing environments and, more particularly, to computer-implemented methodology related to reusing cost-based optimization decisions in a data processing system, such as a Database Management System (DBMS).

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of underlying system implementation. In this manner, the DBMS provides users with a conceptual view of the database that is removed from the hardware level. The general construction and operation of a database management system is known in the art. See e.g., Date, C., *An Introduction to Database Systems*, Volume I and II, Addison Wesley, 1990; the disclosure of which is hereby incorporated by reference.

DBMS systems have long since moved from a centralized mainframe environment to a de-centralized or distributed environment. One or more PC "client" systems, for instance, may be connected via a network to one or more server-based database systems (SQL database server). Commercial examples of these "client/server" systems include Powersoft™ clients connected to one or more Sybase SQL Server™ database servers. Both Powersoft™ and Sybase SQL Server™ are available from Sybase, Inc. of Emeryville, Calif.

As the migration to client/server continues, each day more and more businesses are run from mission-critical systems which store information on server-based SQL database systems, such as Sybase SQL Server™. As a result, increasingly higher demands are being placed on server-based SQL database systems to provide enterprise-wide decision support—providing timely on-line access to critical business information (e.g., through "queries"). Accordingly, there is much interest in improving the performance of such systems, particularly database queries, for enhancing decision support.

SUMMARY OF THE INVENTION

The present invention comprises a Client/Server Database System with improved methodology for optimizing the performance of database queries. In an exemplary embodiment, the system includes one or more Clients (e.g., Terminals or PCs) connected via a Network to a Server. The Server, operating under a server operating system (e.g., UNIX) includes a Database Server System, such as Sybase Adaptive Server Enterprise (ASE). In general operation, Clients store data in and retrieve data from one or more database tables resident on the Server. Each table itself comprises one or more horizontal rows or records divided into columns or fields of information. For enhancing the speed in which the Database Server stores, retrieves, and processes particular data records, the Server maintains one or more database indexes on each table. A database index, which in an exemplary embodiment is maintained as a B-Tree data structure, allows the records of a table to be organized in many different ways, depending on a particular user's needs, with the speed of retrieving any particular data record significantly improved.

Methodology of the present invention, implemented as an "Abstract Plan on Disc" technology (referred to herein as, "Ariadne"), is provided for turning cost based optimization decisions into stored, reusable items. In particular, the present invention provides a novel language interface to the optimizer, through an Abstract Plan, through which it can be given a description of the desired query execution plan (QEP). The language interface defines a declarative language syntax that allows description of the QEP. It does not specify the sequence of operations the database system's optimizer and code generator should accomplish to generate the QEP, but rather describes the desired outcome. Such an approach provides an abstraction barrier between an optimizer directives language and some specific optimizer and code generator. In this manner, the present invention allows a database system the ability to generate a better execution plan, and thereby realize better query performance. Such a feature has particular utility in avoiding performance regressions on server release upgrade and in query optimization fine tuning.

GLOSSARY

AP—Abstract Plan, a relational algebra describing the execution plan of a SQL query.

ASE—Sybase Adaptive Server Enterprise™, the commercial embodiment, available from Sybase, Inc. of Emeryville Calif.

association—The means by which a specific query is associated with its corresponding AP, if any. For ad hoc queries, for instance, the DML statement text is used as an association.

base table—A persistent material table.

cost based decision—An optimization decision based on a RAFSS search guided by the quantitative estimation of the costs and the selection of the cheapest alternative.

declarative query—A relational calculus expression that specifies the result set by giving its properties, rather than by providing the way to obtain it. The SQL language is isomorphic with a relational calculus.

derived table—A table implemented as a stream of rows, representing the result of a relational operator. Only the current row is accessible at some moment in time. Allows only sequential access, in the order of the flow of rows.

emergent behavior—A complex behavior that is never explicitly given, but comes to life as implied by a set of simple rules that interact.

execution plan of a query—see QEP optimization decision—The act of choosing among the possible next moves for a given point in the RAFSS.

plan—The encapsulation of the association, AP and all status information related to a specific query. To avoid confusion, in this document the term plan will not be used for query execution plan.

procedural query—An relational algebra expression that specifies the result set by giving the composition of relational operators that achieve it. The set of query plans supported by an relational execution engine is isomorphic with a relational algebra QEP—Query Execution Plan, an server engine specific data structure created by the code generation module based on the outcome of the optimization and that directs the processing of a query in the execution module.

query—A relational calculus or algebra expression that denotes a derived table as result set.

query optimization—The process of selecting the best (according to some cost criteria) relational algebra formula (i.e., procedural representation, isomorphic to a query plan) that has the same semantics as the relational calculus formula (i.e., declarative representation, isomorphic to SQL) that specifies a given query. This process can be thought of as an RAFSS search.

query plan—see QEP

RAFSS—Relational Algebra Formulae State Space, a search state space over the set of relational algebra formulae relevant to a query. The optimization process can be thought of as a search in this space, either starting with a formula already semantically equivalent to the query and gradually transforming it to another equivalent one that complies with some criteria, or starting with an empty formula and gradually assembling of smaller pieces the desired outcome.

rule based decision—An optimization decision based on instantiating a set of rules (qualitative heuristics) against the current point in the RAFSS, and selecting the one to apply. The rule's application materializes the choice.

status—Not used in the initial embodiment. In subsequent versions, the plan will ideally include several status fields that would store per plan usage enabling/disabling and other flags, the estimated/actual execution time, page counts, or the like.

stored table—A table that is materialized, i.e., entirely stored at some moment of time. Allows both sequential access in some predefined order and, provided indices are available, direct access and maybe alternate order sequential access. Material tables are either base tables or work tables.

table—The physical implementation of a relation. A table is either material or derived.

work table—A table that gets materialized only temporarily, during the execution of a query, to hold intermediate results.

DETAILED DESCRIPTION OF A PREFERRED EMBODIMENT

The following description will focus on the presently preferred embodiment of the present invention, which is operative in a network environment executing client/server database applications. The present invention, however, is not limited to any particular application or environment. Instead, those skilled in the art will find that the present invention may be advantageously applied to any application or environment where optimization of query performance is desirable, including non-SQL database management systems and the like. The description of the exemplary embodiments which follows is, therefore, for the purpose of illustration and not limitation.

Standalone System Hardware

Figure 1A:
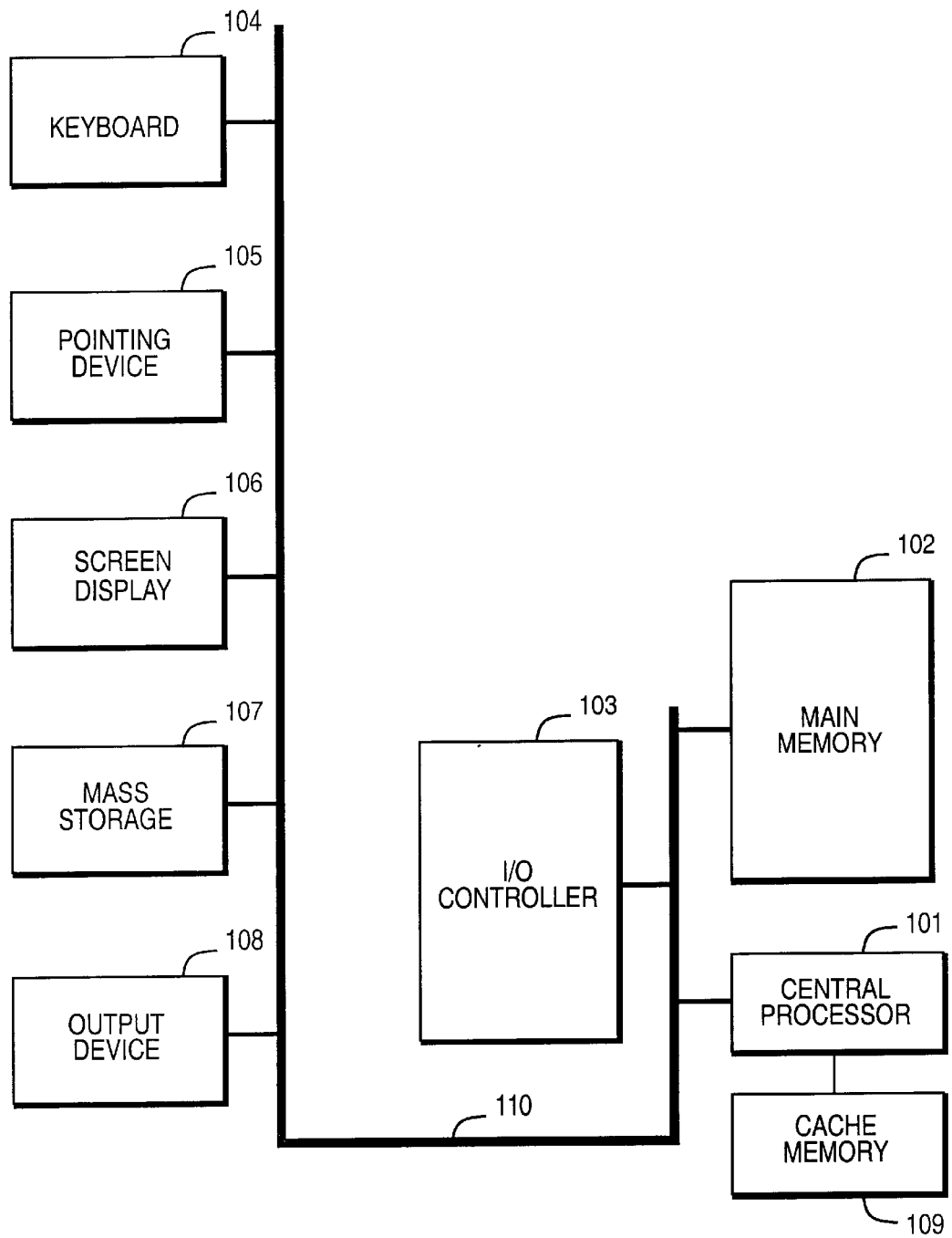
FIG. 1A is a block diagram illustrating a computer system in which the present invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a screen display device 106, and a mass storage 107 (e.g., hard or fixed disk, removable disk, optical disk, magneto-optical disk, or flash memory). Processor 101 includes or is coupled to a cache memory 109 for storing frequently accessed information; memory 109 may be an on-chip cache or external cache (as shown). Additional output device(s) 108, such as a printing device, may be included in the system 100 as desired. As shown, the various components of the system 100 communicate through a system bus 110 or similar architecture. In a preferred embodiment, the system 100 includes an IBM-compatible personal computer system, available from a variety of vendors (including IBM of Armonk, N.Y.).

Standalone System Software

Figure 1B:
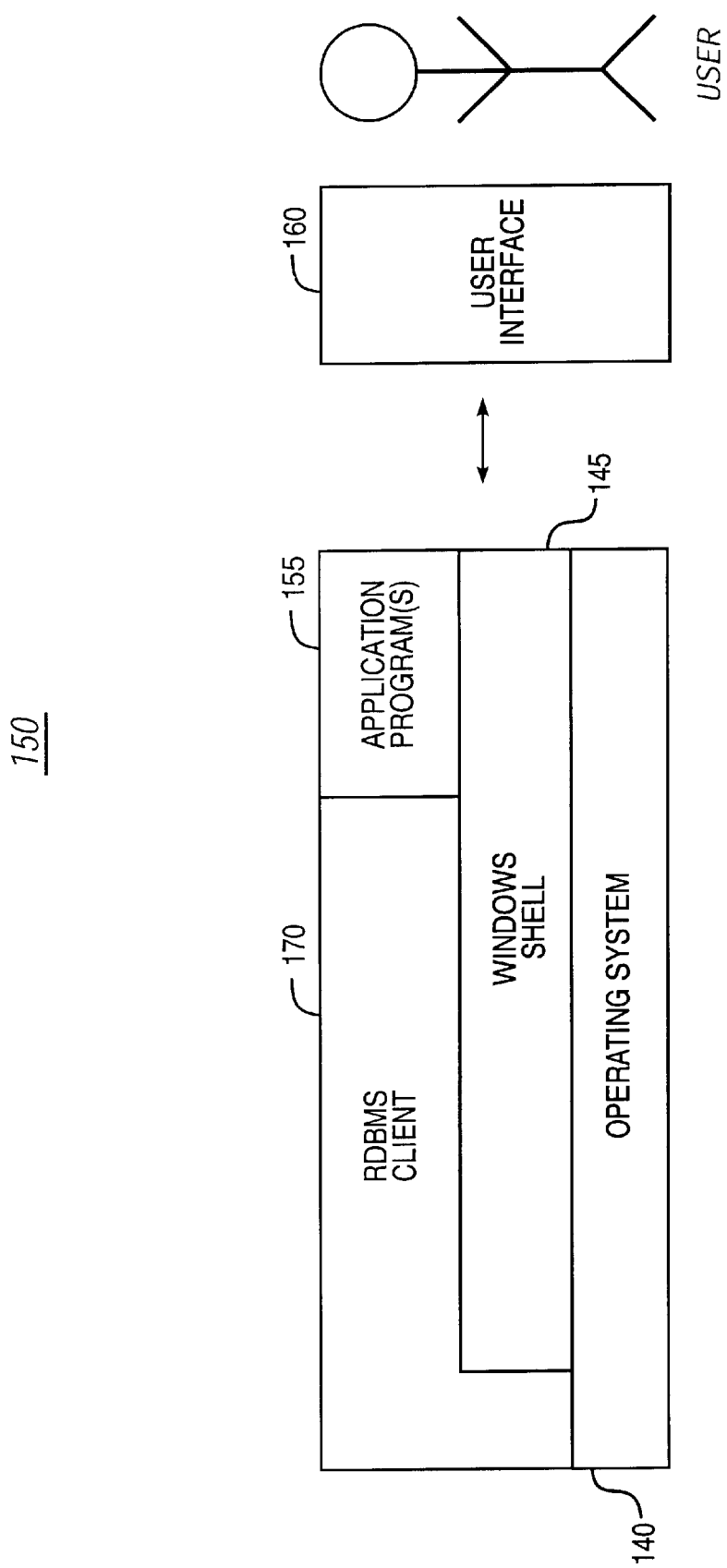
FIG. 1B is a block diagram illustrating a software subsystem for controlling the operation of the computer system of FIG. 1A.

Illustrated in FIG. 1B, a computer software system 150 is provided for directing the operation of the computer system 100. Software system 150, which is stored in system memory 102 and on mass storage or disk memory 107, includes a kernel or operating system (OS) 140 and a windows shell 145. One or more application programs, such as application software 155, may be "loaded" (i.e., transferred from storage 107 into memory 102) for execution by the system 100. The system also includes a user interface 160 for receiving user commands and data as input and displaying result data as output.

Also shown, the software system 150 includes a Relational Database Management System (RDBMS) front-end or "client" 170. The RDBMS client 170 may be any one of a number of database front-ends, including PowerBuilder™, dBASE®, Paradox®, Microsoft® Access, or the like. In an exemplary embodiment, the front-end will include SQL access drivers (e.g., Borland SQL Links, Microsoft ODBC drivers, Intersolv ODBC drivers, and the like) for accessing SQL database server tables in a Client/Server environment.

Client/Server Database Management System

While the present invention may operate within a single (standalone) computer (e.g., system 100 of FIG. 1A), the present invention is preferably embodied in a multi-user computer system, such as a Client/Server system. FIG. 2A illustrates the general structure of a Client/Server Database System 200 suitable for implementing the present invention. As shown, the system 200 comprises one or more Client(s) 210 connected to a Server 230 via a Network 220. Specifically, the Client(s) 210 comprise one or more standalone Terminals 211 connected to a Database Server System 240 using a conventional network. In an exemplary embodiment, the Terminals 211 may themselves comprise a plurality of standalone workstations, dumb terminals, or the like, or comprise personal computers (PCs) such as the above-described system 100. Typically, such units would operate under a client operating system, such as Microsoft Windows/MS-DOS for PC clients.

The Database Server System 240, which comprises Sybase SQL Server™ (available from Sybase, Inc. of Emeryville, Calif.) in an exemplary embodiment, generally operates as an independent process (i.e., independently of the clients), running under a server operating system such as Microsoft Windows NT (Microsoft Corp. of Redmond, Wash.), NetWare (Novell of Provo, Utah), or UNIX (Novell). The Network 220 may be any one of a number of conventional network systems, including a Local Area Network (LAN) or Wide Area Network (WAN), as is known in the art (e.g., using Ethernet, IBM Token Ring, or the like). The Network includes functionality for packaging client calls in the well-known SQL (Structured Query Language) together with any parameter information into a format (of one or more packets) suitable for transmission across a cable or wire, for delivery to the Database Server 240.

Client/server environments, database servers, and networks are well documented in the technical, trade, and patent literature. For a discussion of database servers and client/server environments generally and SQL Server™ particularly, see, e.g., Nath, A., *The Guide to SQL Server*, Second Edition, Addison-Wesley Publishing Company, 1995. Additional documentation of SQL Server™ is available from Sybase, Inc. as *SQL Server Documentation Set* (Catalog No. 49600). For a discussion of a computer network employing Microsoft Networks/OpenNet File Sharing Protocol, see METHOD AND SYSTEM FOR OPPORTUNISTIC LOCKING IN A NETWORKED COMPUTER SYSTEM, Intl. Application No. PCT/US90/04570, Intl. Publication No. WO 91/03024, Intl. Publication Date Mar. 7, 1991. For a general introduction to a Local Area Network operating under NetWare, see Freed, L. et al., *PC Magazine Guide to Using NetWare*, Ziff-Davis Press, 1991. A more detailed discussion is available in NetWare 3.x and 4.x and accompanying documentation, which is available from Novell of Provo, Utah. The disclosures of each of the foregoing are hereby incorporated by reference.

Figure 2:
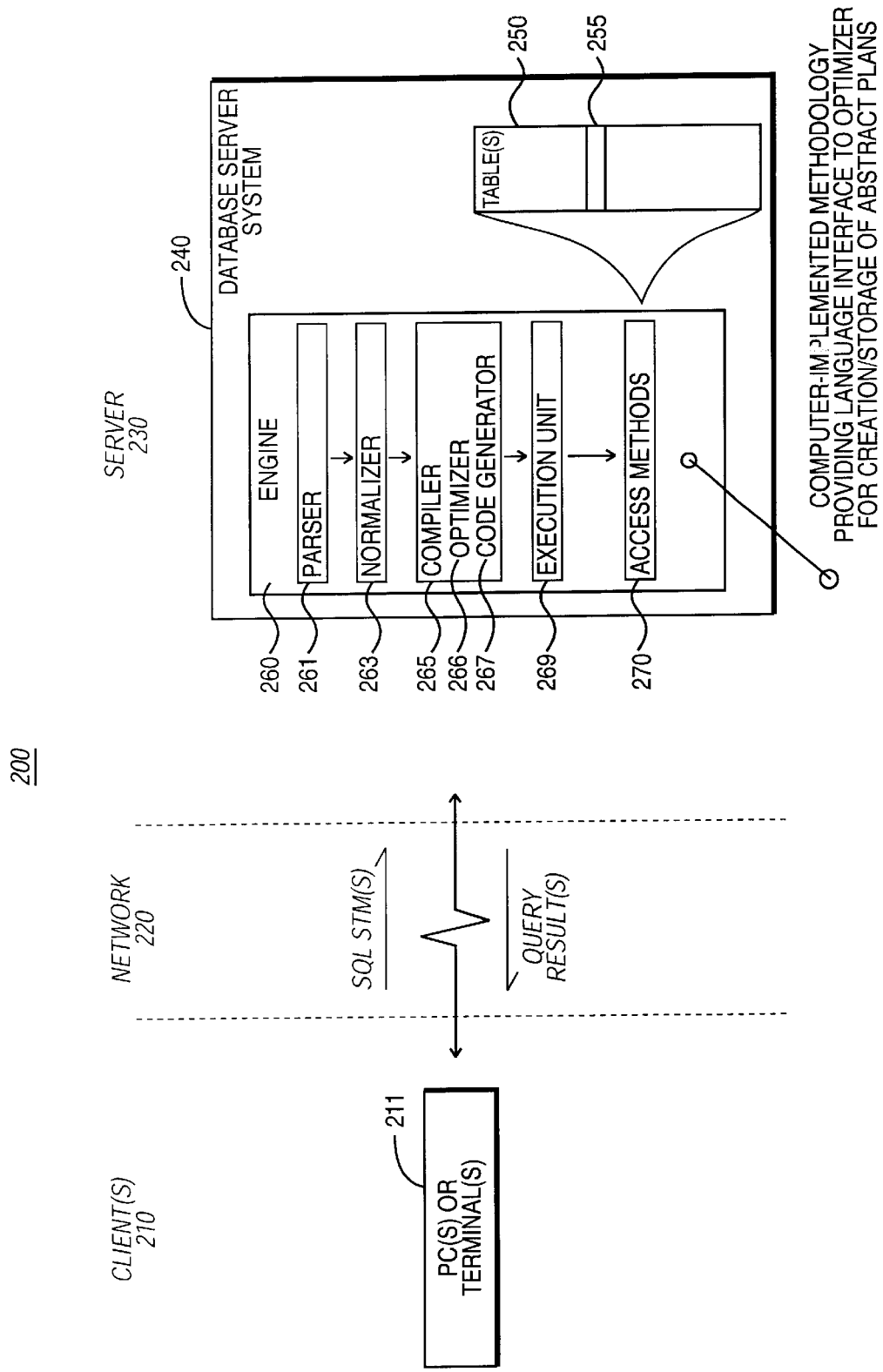
FIG. 2 is a block diagram of a client/server system in which the present invention is preferably embodied.

In operation, the Client(s) 210 store data in or retrieve data from one or more database tables 250, shown in FIG. 2. Typically resident on the Server 230, each table itself comprises one or more horizontal rows or "records" (tuples) together with vertical columns or "fields." A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

In operation, the Clients issue one or more SQL commands to the Server. SQL commands may specify, for instance, a query for retrieving particular data (i.e., data records meeting the query condition) from the table 250. The syntax of SQL (Structured Query Language) is well documented; see, e.g., the abovementioned An Introduction to Database Systems. In addition to retrieving the data from Database Server tables, the Clients also include the ability to insert new rows of data records into the table; Clients can also modify and/or delete existing records in the table.

For enhancing the speed in which the Database Server stores, retrieves, and presents particular data records, the Server maintains one or more database indexes on the table. A database index, typically maintained as a B-Tree data structure, allows the records of a table to be organized in many different ways, depending on a particular user's needs. An index may be constructed as a single disk file storing index key values together with unique record numbers. The former is a data quantity composed of one or more fields from a record; the values are used to arrange (logically) the database file records by some desired order (index expression). The latter are unique pointers or identifiers to the actual storage location of each record in the database file. Both are referred to internally by the system for locating and displaying records in a database file.

In operation, the SQL statements received from the one or more Clients 210 (via network 220) are processed by Engine 260 of the Database Server System 240. The Engine 260 itself comprises a Parser 261, Normalizer 263, Compiler 265, Execution Unit 269, and Access Methods 270. Specifically, the SQL statements are passed to the Parser 261 which converts the statements into a query tree—a binary tree data structure which represents the components of the query in a format selected for the convenience of the system. In this regard, the Parser 261 employs conventional parsing methodology (e.g., recursive descent parsing).

The query tree is normalized by the Normalizer 263. Normalization includes, for example, the elimination of redundant data. Additionally, the Normalizer performs error checking, such as confirming that table names and column names which appear in the query are valid (e.g., are available and belong together). Finally, the Normalizer can also look up any referential integrity constraints which exist and add those to the query.

After normalization, the query tree is passed to the Compiler 265, which includes an Optimizer 266 and a Code Generator 267. The Optimizer is responsible for optimizing the query tree. The Optimizer performs a cost-based analysis for formulating a query execution plan. The Optimizer will, for instance, select the join order of tables (e.g., when working with more than one table); it will select relevant indexes (e.g., when indexes are available). The Optimizer, therefore, performs an analysis of the query and picks the best execution plan, which in turn results in particular ones of the Access Methods being invoked during query execution.

The Code Generator, on the other hand, converts the query tree into a set of instructions suitable for satisfying the query. These instructions are passed to the Execution Unit 269. Operating under the control of these instructions, the Execution Unit 269 generates calls into lower-level routines, such as the Access Methods 270, for retrieving relevant information (e.g., row 255) from the database table 250. After the plan has been executed by the Execution Unit, the Server returns a query result or answer table back to the Client(s).

Of particular interest to the present invention is the optimization of query execution by implementing methodology for reusing cost-based optimization decisions. Modification of the Engine 260 for achieving this optimization will now be described in further detail.

Reusing Cost-Based Optimization Decisions

A. Introduction

Cost based optimizers are difficult to manage. Their behavior relies on a statistical cost model, in that their decisions are based on cost estimations. Such estimations are in general correct, but can be, in specific cases, inaccurate. These inaccuracies are accidental when the implementation of the cost model has bugs, or inherent to the limitations that all models have with respect to the baroque complexity of reality.

Also, there is no clear sequence of decisions that starts with a calculus (declarative) representation of a query that is isomorphic to the SQL statement and gradually produces an algebraic representation that is isomorphic to the plan. Rather, the cost estimations of the several pieces of a candidate plan are combined together with hardly predictable interrelations to produce the candidate plan's overall cost estimation. This costing determines the final layout of the query. Tuning an optimizer (i.e., changing the estimation of a piece) propagates up to affect maybe in different ways the estimated cost of all plans that use that piece. It is in general impossible to point to the precise cost model item that determined a specific feature of the plan. Hence code generation based on a cost based optimizer can be thought of as an emergent behavior. But optimizers are written by humans. By these reasons, the optimizer decisions related to a specific query in a specific data context can be wrong, or sub-optimal, in that some other plan than the one selected by the optimizer does execute a lot faster. Such mishaps are hard to reproduce due to the typically massive amounts of data that make the wrong decision relevant. Indeed, few customer care about the wrong plan chosen for queries that scan just a few rows—generally they do not notice.

Incorrect plans are hard to track down to the root cause, due to the emergent behavior nature of optimization. An engineer has typically to analyze the estimated and actual costs per plan item for both the wrong and the right plan, and understand where the discrepancy originates. They are even harder to fix: any change in the optimizer's cost model globally affects the behavior of the optimizer as a whole and can result in queries that had a fast plan before the fix and get, after the fix, a slow one. A judgement can be made, in general, about the probability of such queries being used. However, there is not enough correlation between the probability of a regressing query to be used by the installed base and its business impact if it is.

The worse (and typical) context for such technological adventures is when the production application of some very important customer, that used to deliver the expected performance, runs 10 times slower after a much awaited maintenance release upgrade. In such cases, if the customer issue is not quickly solved, the customer is very dissatisfied. These undesirable but fatal side effects of optimizer behavior changes are a major headache to both database vendors, their customers, and their support and engineering organizations. Since one cannot eliminate the optimizer induced performance regressions, some technology that limits their consequences is highly desirable.

B. Design Considerations

The present invention implements an "Abstract Plan on Disc" technology (referred to herein as, "Ariadne") that aims at turning the cost based optimization decisions into stored, reusable items.

1. Use

Such a feature provides two functionalities: (1) Avoiding performance regressions on server release upgrade, and (2) Query optimization fine tuning. The first usage is aimed for production environments. When a new server version includes costing model changes, it is common that some customers experience performance regressions. As already noted, this is due to the statistical nature of cost based optimization and to the installed base tuning phenomenon in general, but is also due to several historical particularities of vendor-specific optimizers in particular. Major changes in the costing model bring such risks. Being able to use the old optimization decisions to bypass the new costing model would solve a large class of customer incidents.

The typical usage would imply massively saving plans with the old version, then upgrading. If the new optimizer performs well, then Ariadne is not needed. However, if there are performance regressions, the new plans should be also massively captured (to facilitate diagnosis), then the old plans should be massively used to unblock the customer's production. Ideally in a couple of days the comparison of the old/new set of plans would allow one's Tech Support department to identify the offending queries, and while the corresponding Engineering department focuses on fixing the problem (if ever possible) the customer's production environment continue to use Abstract Plans only for this reduced set of queries. Eventually, when the issue is fixed (if ever possible and desirable), the customer receives a new server and disables the usage of Abstract Plans altogether. This usage style will be called hereafter the brute force approach.

The second usage style is Query optimization fine tuning. In this case, the execution plans of a very reduced set on queries get special attention and use hand tuned Abstract Plans rather than the optimizer's best guess. That would be beneficial in the final stages of development—to understand and, if needed, influence the optimizer's decisions. But it would be also useful in production environments, for the specific queries that with their specific data do not match the optimizer's model. As was already noted, this can happen not only due to a bug, but rather as a fatal consequence of any model's limits.

While the previous usage was of a brute force nature, this one is more like a if surgical strike approach, and will be called this way hereafter. The current forced options (force index, plan, prefetch, replacement strategy, parallel degree) are of the same nature, but they have limited expressive power and anyhow cannot be used with SQL generator 4GLs or vendor-independent, value-added-reseller code. The last point highlights the need of a query plan description feature that is not syntactically included the query's SQL text. Ariadne works this way. Note that the value-added resellers could make use of either the brute force or of the surgical strike approaches by bundling either all or some Abstract Plans with their application.

2. Standards

The Abstract Plan deals with implementation details of a server processing SQL language and, more precisely, influences the selection of the execution plan of a query. The ANSI/ISO SQL standard (SQL92) carefully avoids this area, and restricts its reach to the functional specification of the SQL language. Hence this approach has no impact whatsoever on the standards conformance, neither is the SQL standard directly relevant to this project.

However, the standard does have a more subtle, indirect impact: it describes the language to be implemented by servers that claim conformance. Hence the standard influences the execution engines, that have to deal with subqueries, UDFs, views, referential integrity, and so forth. The optimizer itself must model the execution to be able to cost it, hence is influenced by the level of complexity of the language. These implications on the execution model must be weighted with respect to the expressive power of the technology's algebra. The aim of the Abstract Plan algebra from this perspective is to provide at least the framework that can be naturally extended to describe the existing SQL92 DML features, and most of the SQL3 ones.

3. Localization

Both the AP and the association should support all character sets and languages supported by commercial DBMSs (e.g., ASE), as the association is actually the statement's text and the AP contains names of user tables/views.

4. Performance

As already discussed, there are two ways to use Ariadne technology: the brute force approach, and the surgical strike approach. There are two aspects of performance: (1) Ariadne's processing per se, as a query optimization overhead, and b) Ariadne's implications in the optimization process, thus in the query execution performance.

In general, Ariadne should be preferment and scalable. Ideally it will introduce little if no overhead. The optimization of large joins should even be faster, as the RAFSS is reduced, the extreme case being a full specified AP that identifies an unique join order and access path combination. The usage or row level locking for the AP catalog should avoid setting scalability limitations.

For the brute force approach, the aim is to avoid bringing significant compilation overhead or scalability limitations. While at the capture phase, that is supposed to last only for a couple of days, a small overhead due to the massive catalog updates could be acceptable, the usage phase should ideally be perfectly transparent.

For the surgical strike approach, there should be no scalability limitations at all, and some hypothetical processing overhead should be largely compensated by the much better execution performance. b) Ariadne's implications in the optimization process, thus in the query execution performance.

The ability to generate a better execution plan than the optimizer is the focus of the technology. If an AP based compilation does not produce such a plan, then the optimizer should be allowed to go its own way. For the brute force approach, the aim is to maintain the execution performance level of an old plan. This cannot be guaranteed in general, as with new versions both the execution model and the rule based transformations could themselves evolve, and make an old AP ineffective. As an example, if a normalization change (or regression) switches the place of cast nodes in a heterogeneous datatypes join, an index that previously reduced the scan and made the AP preferment could have no scan arguments (SARGs) and result in bad performance. However, it is expected that such cases will not be representative, and even then the surgical strike approach would offer solutions for them.

For the surgical strike approach, the aim is to give, for some specific cases, a much better overall performance then the optimizer does, as some specific queries are not covered by the optimizer's model. The worse case is that a better plan cannot be obtained with the AP, in which case the AP will simply not be used. Hence the performance can only be increased.

C. Optimizer Concepts

1. General

Intuitively speaking, a cost based optimizer uses a model of the execution environment. There will always be specific queries that for specific data distributions are not well modeled. In such cases, the optimizer's outcome, i.e., the estimated cheapest plan, will randomly match reality, i.e., the actual best plan.

A class of queries that are not covered by the optimizer model are the optimize time unknown usage skew queries. Data skew means that the distribution of duplicate values of a column is asymmetrical, that is some of the values are unique or have few duplicates, while other have a lot of duplicates. When the searched value is known, the statistics model identifies correctly the expected amount of duplicates (by using distribution steps or histograms). However, when the value is unknown, an overall average value (the density) will be used. The density model relies on the assumption that some uniform usage will be made of the skewed data.

However, there are cases when the usage itself is highly skewed. Consider a table containing thousands of lines with information for the last 5 years, and very few lines for all years back to the beginning of the century. The density will assume a medium amount of duplicates, and this would be true provided all years are uniformly queried. However, if the joins in which this table is involved are such that most of the times rows of the last 5 years qualify, the actual amount of duplicates will be much higher. In the other way around, the joins that mainly qualify rows older than 5 years will get a too high duplicates estimation.

This example highlights a typical case of optimizer model inherent limitation. But there are others. The solution is to be able to either influence or completely constrain the RAFSS search, using a language that gives indications to the optimizer, are referred to herein as language X. Language X would be a human readable interface to the optimizer. Given a query that has an associated expression in X, the execution plan of the query should comply to the associated expression.

2. Abstract Plans as Declarative Directives

This section will introduce the concepts behind the formalism chosen for the language X. The language X will describe the QEP. It will be the task of X's language processor to interact with the optimizer and, given an X expression associated to a query, to enforce that the corresponding QEP is compliant to the description given in X. One can thus say that the language X will be a declarative language and not an imperative one. It does not specify the sequence of operations the optimizer and code generator should accomplish to generate the QEP, but rather describes the desired outcome. Such an approach lays an abstraction barrier between an optimizer directives language and some specific optimizer and code generator. Still, the language X needs to be invented. It cannot be SQL itself, as SQL (despite being a declarative language) describes query results and not the anatomy of query processing. The search for a formalism that fits the needs of the language X passes through the analysis of what it should describe, and for whom.

3. Relational Algebra vs. Relational Calculus

In the relational theory, there are two formalisms for describing expressions over relations: algebras and calculi. A relational calculus expression is a declarative description. It explicitly gives the properties of the result set and the base relations to be combined for that, but not the way to combine them to get the desired result set. Relational databases query data stored in tables using a declarative language that is an implementation of a relational calculus, like SQL or QUEL. For instance, the SQL query:

```
select distinct c.name, p.name
    from parts p, customers c, orders o
    where
        p.part_id = o.part_id
        and o.cust_id = c.cust_id
        and c.country = "Fr"
        and p.cost * o.no_items > 100000
        and o.date > dateadd(day, -7, getdate())
    order by c.name, p.name, o.no_items
``` returns the French customers that passed large orders on specific items during the last week, together with the items they ordered. However, it does not explicitly show how to process the three base relations to obtain the desired result.

A relational algebra expression is an imperative description. It explicitly shows how to connect base and intermediate relations with relational operators, like join, restrict, project, union, and the like, to get the desired result. Conversely, the properties of the result set are not explicit, but implicit. A QEP interpreted by the execution engine of relational databases is isomorphic to a relational algebra expression. For instance, the expression:

```
(sort ()
(project (c.name p.name)
(join (p.part_id = o.part_id and p.cost * o.no_items > 100000)
(join (o.cust_id = c.cust_id)
(restrict (o.date > dateadd(day, -7, getdate())))
(table (orders o))
)
(restrict (c.country = "Fr")
(table (customers c))
)
)
(table (parts p))
)
)
)
``` precisely describes how to obtain the resulting derived table. A relational database code generator will be able to build a QEP for this expression, and a query execution engine that implements the join, restrict, project and sort relational operators will be able to interpret this QEP and return the desired results. Still, one has to deduce that orders issued by non-French customers, or French customers with only small amounts during the last week, despite being qualified at the base table scan level, will not be part of the final result.

Note that there is always a canonical algebra expression giving the same result set as a calculus expression. Actually, the SQL language query semantics is given in terms of such an expression. It is obtained by projecting on the SELECT clause expressions the restriction on the WHERE clause predicate of the Cartesian product of the FROM clause base tables. For the SQL query above, the equivalent canonical algebra expression is:

```
(sort ()
(project (c.name p.name)
(restrict ( p.part_id = o.part_id
    and o.cust_id = c.cust_id
    and c.country = "Fr"
    and p.cost * o.no_items > 100000
    and o.date > dateadd(day, -7, getdate()))
(join
```

```
(join
(table (parts p))
(table (customers c))
(table (orders o))
)
)
)
)
```

The QEP obtained from this expression might be slow, but will be valid. Such canonical algebra expressions stay isomorphic with their initial calculus expression. They are the link between the two notations.

4. An Optimizer's Input and Output

The optimizer's task is to chose among the many semantically equivalent QEPs the one it assumes to run faster, or, in general, complies the best to some optimization criteria. The input of the optimizer is the SQL query, or rather an isomorphic data structure obtained through parsing and some pre-optimization processing. For instance, ASE will normalize the query tree, then preprocess it, i.e., resolve the views, aggregates, subqueries, unions and RI constraints.

Some of these operations are semantically implied by the information in the system catalogs, like adding RI constraints checks (but not resolving them too on the flight or deferred checks) and view replacement (but not resolution, i.e., associating to a view in the FROM clause its definition, but not also deciding about merging or materializing it). Note that both distinctions above are conceptual and not present in the ASE code, that atomically associates and resolves both views and RI constraints checks. Other operations imply flattening some nested statement constructs as parts of the statement's main join, like view resolution through merging, subquery resolution through flattening and on the flight RI checking. Such transformations are rule based algebraic rewrite optimizations. Hopefully, adding most items to the same join will result in a better QEP, as one increases the optimizer's search space, hence its chance to make a better choice. Yet others imply breaking the statement in several elementary joins, and storing intermediate results in work tables or CONSTANT nodes. This will be the case for view resolution through materialization, all aggregate resolution, subquery resolution through nesting or materialization, all union resolution and deferred RI checking. All of these last transformations are mandatory and reflect semantic necessities, like limitations of the execution model.

Let us call the outcome of this transformations, i.e., the set of elementary joins (but not the processing of each of these joins) together with the work tables and CONSTANT nodes connecting them, the high level QEP structure. The ASE cost-based optimization per se has no impact on this high level QEP structure. It only chooses the join order and access path for each of the elementary joins. It also takes some limited decisions that affect the high level structure: reformatting and sort averting. The OR strategy would be of a similar nature, but ASE actually hides it more like an access method than as a work table operation. So, the input to the optimizer is the high level QEP structure described above, with each elementary join in a canonical form, i.e., isomorphic to both its initial declarative, calculus expression and to its canonical imperative, algebra expression. For ASE, it is the normalized and preprocessed query tree.

The output of the optimizer is the QEP or an isomorphic data structure. For ASE, it is the JOINDATA data structure added to each elementary join, that describes the join order and access methods of that join. The actual QEP is obtained by code generation based on the above. As the QEP itself is isomorphic to a relational algebra, one may conclude that both the input and the output of the optimizer are isomorphic to two relational algebra expressions. The input is the canonical expression, let us call the output the cooked expression.

5. Relational Algebras as Abstract Plans

Going back to language X, it should be able to instruct the optimizer to transform a canonical expression into a cooked one. Or, to be more precise, given the optimizer's input, that is isomorphic to the canonical expression, to instruct the optimizer about generating its output, that is isomorphic to the cooked one. To do that, an X expression will describe the desired optimizer output, i.e., a data structure isomorphic to the cooked expression. Then, both X's language processor and the native SQL optimizer will collaborate to generate an optimizer output that is compatible with the expression given in X. The natural choice for X will be a relational algebra. Nothing describes better something isomorphic to a relational algebra expression than the relational algebra expression itself. Language X will describe the desired QEP, but without going into the physical details that the optimizer and code generator are able to infer by themselves. Language X will have an abstract nature, and stay away of the implementation details of a specific query processing engine, like ASE. So, as X expressions are relational algebra expressions that describe QEPs, they are abstract plans. The true name of language X is thus Abstract Plan, or AP. It is a relational algebra that describes the required properties of the QEP.

6. Operator vs. Functional Notations

As to the style of the notation to be used, there are several possibilities. Consider a two-table join, like:

---
select * from t1, t2
---

The algebra expression connecting the nested_loops binary relational operator to its two base relation arguments t1 and t2 could be:

functional
   list (Lisp) style

---
(nested_loops t1 t2)
--- application style

---
nested_loops(t1, t2)
--- operator

---
t1 nested_loops t2
---

The three are identical in expressive power, the difference being in readability. Note that the operator style could imply parsing ambiguities that can be solved implicitly by associativity and precedence rules or explicitly by parenthesis. Also that the application style requires a construct for lists—as the list of projection expressions. Finally, the Lisp notation, if also applied to non relational expressions, like restrict and join operator predicates and project operator expressions, makes them look different of their SQL expression. AP uses the Lisp style functional notation.

7. Logical vs. Physical Algebra

Relational algebras can be either logical or physical. Logical algebras are pure relational formalisms, i.e., their only operators are the mathematical (multiset) relational operators: join, outer-join, semijoin, restrict, project, delta-project, aggregation, union, intersection, difference, and the like. Non-relational elements, like algorithms implementing the operators, sorting, access methods to stored data, or the like, are not present. Such elements fill the gap between the mathematical formalism and actual engines implementing it. Each logical operator has an associated set of physical operators, that implement it. For instance, the join logical operator is associated to a set of physical operators describing the various join algorithms: nl_join, sm_join, hh_join, and so forth.

Physical algebras contain only physical operators. The canonical algebra expression describing the optimizer's input is in general a logical one. No algorithms are chosen yet. The QEP description that the optimizer produces is in general a physical one, precisely instructing the code generator. The AP algebra needs to reach the physical level. It has to describe precise execution mechanisms, as join techniques and types of scans. So, the AP algebra needs to contain operators that describe specific join algorithm and access path. Thus, nested loops, merge join, index scan need to be present.

To illustrate this with an example, let us consider the query (where cij is a column of table ti):

---
select c11, c21 + 1 from t1, t2 where c12 = c22 and c23 = 0
---

A semantically complete canonical expression of this query in a logical relational algebra would be:

---
(project
(c11 (+ c21 1))
(restric
(and
(= c12 c22)
(= c23 0)
)
(join
t1
t2
)
)
)
---

An optimizer could manipulate it to obtain an efficient plan, that pushed the restriction as down as possible, and uses the join order that takes best advantage of the join clauses, indices and relation cardinalities, as described by the following cooked expression:

---
(project
(c11 (+ c21 1))
(restrict
(= c12 c22)
(join
---

```
         (restrict
         (= c23 0)
         t2
         )
         t1
         )
         )
         )
```

Then, it would be the task of the compiler to generate an QEP that scans t2 with an index on c23, t1 on an index on c12 and uses nested loops for the join. But, this could actually be wrong! Maybe t2 should actually be scanned on an index on c22, without restricting the scan but only the qualifying rows, and merge join should be used instead. Clearly the above logical algebra does not provide a sufficient level of details.

What is actually needed as an input to the code generation are the specific access methods and join algorithms. This is achieved by either of the following (suppose the indices of t1 and t2 are called i_c ... ):

```
         (merge_join
         (index_scan
         i_c22
         t2
         )
         (index_scan
         i_c12
         t1)
         )
         )
         (nested_loops
         (index_scan
         i_c23
         t2
         )
         (index_scan
         i_c12
         t1)
         )
         )
```

One would thus expect to see in the AP algebra constructs that describe the query processing building blocks, as joins and the different join algorithms, indices, index and table access methods, derived table materialization and potentially even pure procedural ones, like sequencing several execution steps and holding intermediate results in work tables.

8. Semantic Completeness of an Abstract Plan

Let us go back to the two physical algebra expressions above. At such a level, one can either rely on the code generator to identify the places where each clause should be used, or add them to the description:

```
         (= c21 c22)
         (restrict
         (= c23 0)
         (index_scan
         i_c22
         ()
         t2
         )
         )
         (index_scan
```
```
         i_c12
         ()
         t1)
         )
         )
         (nested_loops
         (= c21 c22)
         (index_scan
         i_c23
         (= c23 0)
         t2
         )
         (index_scan
         i_c12
         ()
         t1)
         )
         )
```

In the merge join case, this formula indicates that the join should be done on "c21=c22", that both tables need a full index scan but that t2 can be filtered on "c23=0" before the join. For the nested loops plan, "c23=0" will be actually used to limit (position and stop) the index scan.

An AP algebra is semantically complete when it conceptually allows the code generator to base the QEP of a SQL statement only on the corresponding AP expression and fully bypass the SQL statement and its previous processing, as parsing, normalization, preprocessing and optimization. If the SQL statement carries information that is not represented in the AP, then the AP algebra is not semantically complete. For instance, if the AP algebra only describes relational expressions but not scalar ones, it will be semantically incomplete, as it cannot describe the predicate in the WHERE clause and the expressions in the SELECT list. It is the responsibility of the optimizer and code generator to manage all the information in its input that is not described by the AP algebra.

Note that the semantic completeness reaches further than its definition. For an embodiment in ASE, actually basing the query compilation on the semantic completeness of the AP would not be practically desirable, as the query tree contains data type normalization information obtained by catalog lookup, and throwing it away before code generation would require normalizing again. However, it is impossible to express complex algebraic transformations with a semantically incomplete AP, and optimizing with algebraic transformations is currently done based on heuristics rather than cost-based, a less flexible technology. Hence, the semantic completeness of the AP algebra is in principle a desirable feature even when the code generation is not based solely on the AP. Currently, the AP algebra is not semantically complete. The initial embodiment of Ariadne does not attempt to express algebraic transformations, so the restrict and project operators together with their non-relational expressions are not needed.

9. Full and Partial Plans

Given an AP algebra, some QEP can get a full description within the limits of the model, or just a partial one. A partial one can be augmented to better describe the QEP, while a full description cannot, as all that can be said about the QEP (within the expressive limits of the AP algebra) is said. For instance, for an AP algebra that describes at the physical level joins and scans, consider the SQL query:

```
select *
from t1, t2
where c11 = 0 and c12 = c22
```

A full description would be:

```
(nl_join
  (i_scan i11 t1)
  (i_scan i22 t2)
)
```

Indeed, there is nothing more that can be said within the limits of the AP algebra at hand, except the join algorithm, the join order, and the access method for each stored table. Conversely, the following APs are all partial, less and less complete:

```
(nl_join
  (i_scan t1)
  (i_scan t2)
)
(nl_join t1 t2), (i_scan i11 t1)
(nl_join t1 t2), (i_scan t1)
(nl_join t1 t2)
(i_scan i11 t1), (i_scan i22 t2)
(i_scan t1), (i_scan t2)
(i_scan i11 t1)
(i_scan t1)
```

In general, a partial plan excludes only parts of the RAFSS leaving thus more freedom to the optimizer, while a full one tightly constraints the optimizer choices. Partial plans are lists of AP expressions and are called hints.

Another way a plan may become partial is to use logical operators instead of physical ones. For instance, the following AP leaves to the optimizer the choice between the possible join algorithms:

```
(join
  (i_scan i11 t1)
  (i_scan i22 t2)
)
```

An important consequence is that, to allow partial plans, the AP algebra may not be a pure physical one, but a mixed algebra containing both the mathematical operators and the algorithm related operators.

10. Non Relational Elements

Except for the physical and logical relational operators, the AP must describe non-relational elements. To start with, the physical operators have set of properties influencing their behavior. For instance, a scan can use LRU (least-recently used) or MRU (most-recently used), large IOs, can be serial or parallel, and the like. Traditional optimizer directives allow the specification of such properties, and so will the AP algebra. Then, a formula's usage will imply matching the formula's parts against the query at hand to identify to what query tree element a directive applies, then interpret the directive in the query's context to force the optimizer's behavior.

The current version of AP algebra uses a simple solution, as it does not attempt to influence the high level QEP structure and it does not describe predicates and other scalar expressions. The AP algebra contains a high level, non-relational layer isomorphic to the high level QEP structure. It is required that an AP perfectly matches at the high level the optimizer's input (except for hints plans, when each hint in the list is tentatively applied to each elementary join). For each elementary QEP join tree, the participating stored tables allow a perfect match with the AP at the leaf level. Then, the tree structure described by the AP can be cloned into the QEP.

There is a slight difficulty related to ambiguous usage of the same table name in a query. Correlation names are the SQL technique used to disambiguate such statements. However, there are cases when a SQL statement that uses several occurrences of the same table name is not ambiguous, while its corresponding AP is. For instance, it is legal in SQL to use the same table name in both the main query and a subquery or a view contained therein. If the subquery is flattened, or the view is merged, then the AP will be ambiguous. The AP algebra solves this by qualifying table names occurring in subqueries or views with the subquery number or view name.

11. Operator to Operand Glue

When the AP language is not semantically complete, the QEP of a query will contain items not described by its AP. These QEP items have no AP counterpart and are interspread between the QEP items that do. For instance, even if the AP does not describe project and restrict operators, the QEP will contain them. Consider the query:

```
select *
from t1, t2
where c11 < c12
and c11 > 100
and c12 = c21
```

Its full (within the limits of a given AP language), but semantically incomplete AP would be:

```
(nl_join
  (i_scan i_c11 t1)
  (i_scan i_c21 t2)
)
```

However, in a semantically complete algebra (called SCA), the same query is described by:

```
(nl_join
  (restrict (c11 < c12)
  (i_scan i_c11 (c11 > 100) t1)
  (i_scan i_c21 (c12 = c21) t2)
  )
)
```

An extra operator, restrict, has stalked its way between the nl_join and t1's i_scan. One cannot say that the glue between AP operators and operands is strong, as the optimizer and code generator are allowed to insert extra relational operators between the AP operator that is a consumer of a derived table, and the producer of that derived table, that is an immediate operand in the AP expression of that operator.

An AP operator is said to be tightly coupled to its operand when a compatible QEP is not allowed to have any intermediate items between the ones described in the AP by the operator and by the operand, or that in the SCA expression describing the QEP the corresponding operator is directly applied to the corresponding operand. An AP operator is said to be loosely coupled to its operands in the opposite case, when the only requirement is that, in the directed graph of the SCA expression describing the QEP, a path goes from the corresponding operator to the corresponding operand. When all operators in the AP language are tightly coupled, the AP is said to be tightly coupled. If all are loosely coupled, the AP is said to be loosely coupled. Note that a tightly couple AP is not necessarily a semantically complete one. The requirement is rather that it describes with relational operators all QEP relational algorithms. In a tightly coupled AP, the expression:

```
(join
 (scan t1)
 (scan t2)
)
``` represents an actual join between t1 and t2. In a loosely coupled one, it merely says that t1 is somewhere outer to t2 in the join graph (or join order for left deep tree engines). Likewise, a pair of hints:

```
(join
 (scan t1)
 (scan t2)
)
(join
 (scan t1)
 (scan t2)
)
``` mean, in a loosely coupled AP, just that t1 is placed in the join order somewhere outer to both t2 and t3. In a tightly coupled one its interpretation is less obvious. It is either an error, or (on query engines supporting it), a single n-way join operator (like a Star join) with at least three operands t1, t2 and t3, where t1 is outer to both t2 and t3.

In the initial embodiment, the AP language is loosely coupled. In general, this leaves no explicit way to forbid the optimizer to take a decision. The only way to achieve that is to force an alternative that excludes the undesired one. For instance:

to avoid an index scan of t, one must describe a table scan

```
(t_scan t) ==> not (i_scan t)
``` to avoid a table to be outer in a join, a set of hints should describe it as inner to all other tables

```
(join t2 t1) (join t3 t1) (join t4 t1) ==> not (join t1 ... )
``` by convention, both reformatting and the OR strategy are forbidden when either a table scan or an index scan are forced

```
(i_scan t1) ==> not (scan (store (scan t1)))
 and not (rid_join (union (scan_rid i1 t1) ... ) t1)
(t_scan t1) ==> not (scan (store (scan t1)))
 and not (rid_join (union (scan_rid i1 t1) ... ) t1)
``` there is currently no way to avoid a sort, i.e., to require a sort avert path.

12. Associating an AP to its Corresponding Query

Traditionally, optimizer directives are syntactically included in the statement's text. This is the case with ASE's forced options, as well as for other DBMS systems. Ariadne takes a different approach, as one of the requirements is to be able to influence the optimization of a statement without having to syntactically modify it. This requirement's importance is tantamount. Optimizer directives that are syntactically contained in the SQL statement text have two major shortcomings:

in some cases they cannot be used

This happens, for instance, when the SQL statement is not written by a human, but generated by a program generator. Most SQL generators do not give the user the possibility to modify the generated SQL code. Also, this happens with old production applications, that have the SQL code buried in the binary. Such applications are generally very stable, except when a RDBMS new version contains optimizer changes.

in most cases they are not desirable

SQL is a declarative language, and this is one of its major strengths. The same statement can be executed in many ways, depending on the cardinality and values distribution of the data. In its lifetime, a same statement will thus optimally be executed with different QEPs. However, optimizer directives are static. More, it is against the spirit of the language to expose the details of the query processing in the SQL statement.

Form another perspective, a lot of software vendors who use SQL (and most of the CAPs) strive to keep their code RDBMS vendor independent, to be able to offer their products to organizations that have already made different RDBMS vendor choices. They will keep their SQL code compliant to the standard (currently SQL92), or will be even more conservative and will intersect the standard with the major commercial SQL dialects. However, in this greatest common denominator there is no common optimizer directives feature.

Conversely, this requirement raises a major problem: how to identify an incoming SQL statement, to be able to recognize it and associate it to its corresponding AP. Identifying means naming. But, in general, SQL statements are anonymous; they stand for themselves. (A SQL statement that is part of a stored procedure may be identified by the stored procedure's name or ID and its position within the procedure, but this is a particular case.) It results that the identity of a SQL statement, in general, is given by the statement's textual contents.

The AP association will thus be based on the SQL statement's text. Precisely, it will be based on a transformation of the statement's text. The purpose of this transformation is to eliminate parts of the statement that are irrelevant to the AP. Let us describe the Abstract Plan of SQL statements by an application abstract_plan(s)→ap, defined on SQL statements and taking values in the AP algebra. This application associates to a statement its full AP and is functional. (Note that without the requirement of having full APs, the application is not functional, as a large number of partial plans, or hints, can describe a SQL statement).

Consider a functional application canonical(s)→t defined on strings (a SQL statement being ultimately a string of characters) and taking values in some set T. Note that the canonical form of a SQL statement defined by the canonical( ) transformation is completely unrelated to the canonical algebra expression into which a SQL statement may be transformed. It is just a coincidence of the canonical term usage, as both are representative instances for a set of related items: the canonical algebra expression stands for all the expressions having the same semantics, while the canonical form of a SQL statement, as will be seen below, stands for all the statements associated with the same AP. This application is undefined for strings that are not SQL statements.

The first requirement on T is that it should be possible to base on it an efficient associative memory storage. This memory will be used to store sets of APs. Formally, this memory M implements the functional applications insert(M, T, AP)→M and find(M, T)→{AP}. This memory stores sets of APs associated to a specific t. Formally, if find(m, t)=S and m'=insert (m, t, ap) then find(m', t)=S U {ap}. This memory is filled through the composition add(s)=insert(m, canonical(s), abstract_plan(s)) and searched through the composition associate(s)=chose(find(m, canonical(s))) (where chose( ) is the mathematical selection operator that picks some random element in a set).

The second requirement is that associate( ) is still a functional application for each s, i.e., that two statements that give different plans are mapped to different points in T, or that one can always find back the AP stored with add( ) for any statement s. Since associate( ) is functional, for all interesting points in T find( ) will either fail or find a single element set. Hence the definition are relaxed for M, insert( ) and find( ) to store and retrieve APs instead of sets of APs. Finally, while not being a requirement, the less injective canonical( ) is (provided it complies with the two requirements above), the better it is. Actually, the purpose of this transformation is that the set of statements giving the same AP map to the same point in T, reducing thus the size of M for a given set of statements to store.

A first example of canonical( ) transformation is the identity transformation. Indeed, string comparison (and some hashing technique for performance) allow the implementation of an associative memory. Also, the identity guarantees the functional behavior of associate( ). However, it performs poorly on the third desiderata, as the identity is perfectly injective and thus performs no storage reduction at all. A better example would be the whitespace trimming transformation. However, the storage reduction is still modest. A transformation that returns the set of stored tables accessed by the statement does not obey to the second requirement. Indeed, lots of queries with very different QEPs, hence APs, may access the same tables.

Finally, syntactic parsing, that associates to a statement its query tree does not obey, at first sight, to the first requirement: it is not obvious how to efficiently base an associative memory on a query tree, but not impossible though. The initial embodiment of Ariadne will use whitespace trimmed SQL text as a canonical SQL statement form.

D. User Guide

1. General

Abstract Plan is a novel language interface to the optimizer, through which it can be given a description of the desired QEP. Once an Abstract Plan expression is applied to a statement's optimization, the resulting QEP must be compliant to the given AP. The term Abstract Plan, and the abbreviation AP will be freely used hereafter for both the language itself, and for specific expressions of this language.

A similar functionality exists in ASE: the forced options. For instance, it is possible to force the index used to scan a stored table with the following syntax:

```
select * from t1(index i_c11)
where c11 > 100 and c12 < 0
```

The optimizer is instructed to use the index i_c11 (on column c11) for the scan. It will therefore position the scan using the clause "c11>100" rather than the clause "c12<0". Also, it is possible to force the join order of an individual query:

```
set forceplan on
go
select * from t2, t1
where c11 = c21
and c12 > 100
and c22 < 0
go
set forceplan off
go
```

The optimizer is instructed to put t2 before ti in the join order. It will probably use an index on c22, if available, to scan t2 using the clause "c22<0", and chose between the join clause "c11=c21" and the search clause "c12>100" to scan t1 (in the typical case it will use the join clause, but in general this is a cost based decision and there are cases when the search clause performs better). There are, however, several optimization decisions impossible to force at all, or on a per statement item basis. The subquery attachment point cannot be forced. Neither can the join order of flattened subquery tables. Reformatting and the OR strategy can be forced with trace flags, but apply then to all elements of all queries of all connections that have at least one trace flag enabled, due to the design limitations of the ASE trace flags mechanism.

Also, the forced options require syntactic changes in the statement, that is not always possible or desired. The two forced options examples above can also be described in AP:

```
(i_scan i_c11 t1)
(g_join (scan t2) (scan t1))
```

Abstract Plans are relational algebra expressions that are not syntactically included in the query text. They are stored in a system catalog and associated to the incoming queries based on the text of these queries. They overcome thus the shortcomings of forced options, by offering fine grained description capability and not requiring statement text modification.

2. Expressing Optimization Directives Through Abstract Plans

This section describes how to use APs to influence the optimizer's behavior. To start with, let us focus on the language capabilities of the AP language, and accept that an AP expression is associated deus ex machina to its corresponding SQL query.

The AP language is a relational algebra with the following relational operators:

g_join: the generic join, a high level logical join operator. It describes inner, outer and existence joins, using any available join algorithm (only nested loops in ASE).
   union: a logical union operator. It describes both the UNION and the UNION ALL SQL constructs.
   scan: a logical operator, that transforms a stored table in a flow of rows, i.e., a derived table.

It is needed to define g_join only on derived tables, and allow partial plans that do not restrict the access method.

i_scan: a physical operator, implementing scan. It directs the optimizer to use an index scan of the specified stored table.
   t_scan: a physical operator, implementing scan. It directs the optimizer to use a full table scan of the specified stored table.
   store: a logical operator, describing the materialization of a derived table in a stored work table.
   nested: a filter, describing the placement and structure of some operation relevant to the optimizer. Currently only describes nested subqueries.

The following database schema will be used throughout this section to illustrate AP usage:

```
create table t1 (c11 int, c12 int)
create table t2 (c21 int, c22 int)
create table t3 (c31 int, c32 int)
go
create index i_c11 on t1(c11)
create index i_c12 on t1(c12)
create index i_c11_c12 on t1(c11, c12)
create index i_c21 on t2(c21)
create index i_c22 on t2(c22)
create index i_c31 on t3(c31)
create index i_c32 on t3(c32)
go
```

(a) Access Methods

A prime area for influencing an optimizer is the access path selection. For any specific table, there can be several access path that apply to a specific query: index scans using different indices, table scans, the OR strategy, reformatting. Take the query:

```
select * from t1 where c11 > 1000 and c12 < 0
```

The following APs can direct the optimizer's choice:

use i_c11

```
(i_scan i_c11 t1)
``` use i_c12

```
(i_scan i_c12 t1)
``` use some index, it is up to the optimizer to chose among i_c11 and i_c12, but it should not do a full table scan

```
(i_scan t1)
``` do a full table scan

```
(t_scan t1)
```

Other access paths, like the reformatting and the OR strategy, will be described below, with the complex queries section. Also, the hints section will show how to give the access path for several tables of a query without forcing their join order too.

(b) Join Order

The other fundamental directive APs should be able to give is the join order. This is done by describing the join tree. Consider the query:

```
select *
from t1, t2, t3
where c11 = c21
and c12 = c31
and c22 = 0
and c32 = 100
```

Join operators are binary, so is AP's g_join. The t2-t1-t3 join order of the above query is described by:

```
(g_join
 (g_join
  (scan t2)
  (scan t1)
 )
 (scan t3)
)
```

Note the usage of the logical scan operator, that gives the optimizer the freedom to chose the access methods. Therefore, the above plan is not a full plan, but a partial plan. In general, binary operators may create any binary expression tree, and are described by a tree structure rather than by an order. However, a lot of commercial RDBMS execution engines are limited to left deep trees. Such trees have the derived tables on the left hand, and the stored tables on the right hand (except for the deepest left leaf, that is itself a stored table). A left deep tree is a degenerated tree, that is equivalent to a list. Lists are characterized by the order of their elements, hence for lots of commercial RDBMSes, including ASE, discuss the join order.

In general, a n-way join, executed as a n−1 levels left deep join tree with the order t1, t2, t3 . . . , tn−1, tn is described by:

```
(g_join
 (g_join
  . . .
  (g_join
   (g_join
```

```
(scan t1)
(scan t2)
)
(scan t3)
)
...
(scan tn-1)
)
(scan tn)
)
```

It is important to keep this notation, as it closely matches the relational algebra binary operator join, and is also useful to describe nested element attachment, as will be seen below. However, in most cases it is fastidious for a simple left deep tree, that is best described by its join order than by a degenerated tree. To enhance AP readability, a shorthand syntactic notation was introduced for the above join:

```
(g_join
(scan t1)
(scan t2)
(scan t3)
...
(scan tn-1)
(scan tn)
)
```

It must be clearly understood that the second, n-ary g_join, notation is purely syntactic sugar for the first, binary left deep g_join, tree. It does not describe a n-way join operator, but n−1 binary join operators applied to n operands. Going back to the three way join query, depending on cardinalities and data distribution, the optimizer could select among several plans:

qualify t2 on c22, join with t1 on c11, then with t3 on c31

```
(g_join
(i_scan i_c22 t2)
(i_scan i_c11 t1)
(i_scan i_c31 t3)
)
``` also along the join clauses, but t3-t1-t2 this time

```
(g_join
(i_scan i_c32 t3)
(i_scan i_c12 t1)
(i_scan i_c21 t2)
)
``` or, maybe c21 being non-clustered and t2 fitting in the cache, it is better to do once a full table scan of t2

```
(g_join
(i_scan i_c32 t3)
(i_scan i_c12 t1)
(t_scan t2)
)
``` finally, a STAR join, when t1 is very large, t2 and t3 individually qualify a large part of it, but together a very small part, and the t2-t3 cross product (after restricting their scan) is reasonable small

```
(g_join
(i_scan i_c22 t2)
(i_scan i_c32 t3)
(i_scan i_c11_c12 t1)
)
```

Note that all the above are full plans that completely constrain the optimizer in its choices of join order and access path selection.

The initial embodiment of Ariadne lets the optimizer decide, based on the query, the specific kind of join to use for a generic g_join operator. This is because AP explicitly avoids affecting the query's semantics, that is still fully given by the query tree. Now, logical join operators come in different flavors, with different semantics: inner joins, outer joins and semijoins. It is undesirable to instruct through the AP the optimizer to build a QEP that has a different semantics than the SQL query. Therefore it is left up to the optimizer to chose the join operator the corresponds to the query at hand and the given join order. Take, for instance, the existence subquery:

```
select * from t1
where c12 > 0
and exists (select * from t2
where t1.c11 = c21
and c22 < 100)
```

The semantics of the statement requires a semijoin between t1 and t2. A t1-t2 order will be interpreted by the optimizer as an existence join implementation of the semijoin:

```
(g_join
(scan t1)
(scan (table t2 (in (subq 1))))
)
``` where t2's scan will stop on the first row matching the current t1 row. Conversely, t2-t1 will be interpreted as a tuple filtering implementation of the semijoin:

```
(g_join
(scan (table t2 (in (subq 1))))
(scan t1)
)
``` where t2 will be scanned on i_c21 to enforce the unicity for inner correlation values.

However, the search clause "c22<100" cannot be used to limit the scan. The "(table ... (in (subq ... ) ... ))" notation is needed to disambiguate some specific subquery statements and will be explained later. For the time being, "(table t2 (in (subq 1)))" is perfectly equivalent to "t2" and can be thought of as a reminder on the syntactic containment of t2.

Instantiations like the one of g_join can be left to the ASE optimizer, as its choices are rather limited. Note that tuple filtering is an on-the-flight form of delta-project, when the data comes ordered. If, for instance, the execution engine also implemented the general delta-project, then the above AP would be compatible with both plans below:

```
(inner_join
(tuple_filter (c21)
(i_scan i_c21 (table t2 (in (subq 1))))
)
(scan t1)
)
(delta_project (c11, c12)
(inner_join
(i_scan i_c22 (table t2 (in (subq 1))))
(scan t1)
)
)
```

Within the current ASE framework, the above query has no QEP for the AP:

```
(g_join
(i_scan i_c22 (table t2 (in (subq 1))))
(scan t1)
)
```

Provided the subquery table correlation columns are not known to have unique values (i_c21 is not declared unique), when the subquery table is joined outer to its correlated main query table and is not scanned on an index on the correlation column, then the ASE query engine can not eliminate subquery generated duplicates in the query result set. The same mishap occurs with outer joins:

```
select * from t1, t2
where c11 *= c21
There is no QEP for the AP:
(g_join
(scan t2)
(scan t1)
)
```

The ASE query engine's single outer join algorithm requires the inner table of the outer join to be also the inner table of the join, to substitute NULLs when no inner row qualifies for a given outer row.

In the initial embodiment of Ariadne, such APs will raise an exception and 5 abort the compilation of the query. They are never generated by the ASE in AP capture mode (mode described further below), and their presence is related to a human error. Finally, note that the AP algebra allows the description of flattened subquery related join orders that can not be required with the traditional forceplan. For instance, given the query:

```
select *
from t1, t2
where c11 = c21
and c21 > 100
and exists (select * from t3 where c31 != t1.c11)
``` that can be flattened to an existence join, the "!=" correlation will make t3's scan rather expensive. If t1 is outer to t2, the best place for t3 depends on whether the join increases or decreases t1's scanned rows. Generally the optimizer should find the light position for t3. If it fails, the following AP should be used when the derived table's cardinality is decreased by the join:

```
(g_join
(scan t1)
(scan t2)
(scan (table t3 (in_subq 1)))
)
```

And the following when it is increased:

```
(g_join
(scan t1)
(scan (table t3 (in_subq 1)))
(scan t2)
)
```

APs and subqueries are also discussed later.
The same applies to merged views:

```
create view v
as
select *
from t2, t3
where c22 = c32
```

When v is merged in a main query, the optimizer generally finds the right join order.
Consider two queries over v:

```
select * from t1, v
where c11 = c21
and c22 = 0
select * from t1, v
where c11 = c31
and c32 = 100
```

Supposing the best join orders are respectively t2-t1-t3 and t3-t1-t2, and the optimizer fails to chose them, the following APs achieve what forceplan could not:

```
(g_join
(scan (table t2 (in (view v))))
(scan t1)
(scan (table t3 (in (view v))))
)
(g_join
(scan (table t3 (in (view v))))
(scan t1)
(scan (table t2 (in (view v))))
)
```

The "(table . . . (in (view . . . . ))" notation should be also taken, for the moment, as such. More on APs and views later.
(c) Join Algorithm Currently ASE implements two join algorithms: nested loops join (NLU) and merge join (MJ). When the g_join operator is used, the optimizer is free to chose the best join algorithm, based on cost estimations. As this decision is as error prone as any other optimizer estimation, it is desirable to be able to force the join algorithm using an AP. This is achieved by adding to the logical g_join operator the couple of physical operators nl_join and m_j_join, that also specify the join algorithm.

Note that "g" (generic) in g_join does not stand for the algorithm, but for the inner/outer/semi flavors of the join semantics, hence is kept in the physical operators. When an algorithm is forced, the FROM clause forced options internal machinery is used by the AP code. The APs generated by the system will use nl_join/m_join instead of g_join. g_join is still a legal operator, that lets the optimizer chose the join algorithm. For instance, given the query:

```
select * from t1, t2
where c12 = c21 and c11 = 0
the following AP describes a NLJ:
(nl_g_join
(i_scan i11 t1)
(i_scan i21 t2)
)
``` whereas the one below a MJ:

```
(m_g_join
(i_scan i12 t1)
(i_scan i21 t2)
)
```

Note that while the NLJ would use the index t1.i11 to limit the scan using the search clause, MJ would need to use t1.i12 for the ordering, to avoid a sort. Alternatively, it could still use t1.i11 and sort the filtered derived table:

```
(m_g_join
(i_scan i11 t1)
(i_scan i21 t2)
)
```

With this AP, the optimizer is expected to know that the outer table has the wrong ordering, and generate a sort on c12 on top of the index scan and below the MJ. The biggest issue brought by MJ is forcing the sorting behavior. It was purposely avoided in Ariadne to have the AP syntax affect the semantics of the query, i.e., the same query optimized with or without an AP may have different performance, but always has the same result set. If one allows the AP syntax to force the sorting behavior on the inputs of the MJ, this does not hold anymore.

Indeed, the MJ algorithm applied to unsorted inputs gives a wrong result set. However, the current ASE optimizer is not that good in propagating the ordering information, specifically for the outer derived table, where it always assumes it must sort. As a consequence, the optimizer would generate sub-optimal plans that sort the outer data flow, even when it is not needed. It is clearly desirable to be able to use APs to indicate the optimal plans, when the outer sort may be averted. Still, there is nocode to check that such an AP indication is semantically valid. Hence, if the outer derived table is actually not ordered, such an AP would result in a wrong result set. The trade-off was to introduce the operators that force the sorting behavior (no sort, sort only outer/inner, sort both: fm_g_join/lm_g_join/rm_g_join/sm_g_join), but to let them undocumented (by now, unless the module that does the semantic check is written) and to generate the m_g_join operator, that does not constrain the sorting behavior. This way, APs can be used for benchmarks and other sensitive situations where people understand what they're doing, but the average user will not have the risks of giving a wrong sort averting directive.

It is expected that on the side where the AP averts the sort, the scan of the table is an i_scan with the specific index that gives the right ordering, but Ariadne does not enforce this. Using again the query above, let us analyze the different possible APs.

```
(fm_g_join
(i_scan i12 t1)
(i_scan i21 t2)
)
```

The AP above averts both sorts, and forces the right indices.

```
(fm_g_join
(i_scan i11 t1)
(i_scan i21 t2)
)
```

The AP above is wrong. It forces no sorting, but the index on the outer table does not give the right ordering. A wrong result set will be produced.

```
(lm_g_join
(i_scan i11 t1)
(i_scan i21 t2)
)
```

The AP above forces the sort of the outer derived table, and forces the index that can use the search clause to limit the scan. It also forces not to sort the inner table, that is fine given the index used for the scan.

```
(rm_g_join
(i_scan i12 t1)
(i_scan i21 t2)
)
```

The AP above does an useless (and harmless) sort of the inner derived table, that had the right ordering due to the index scan. The outer derived table is not sorted, that is fine given the index used for the scan.

```
(sm_g_join
(i_scan i11 t1)
(t_scan t2)
)
```

The AP above forces the sort of both outer and inner derived tables. That was needed, given that the outer one uses an index that does not bring the right ordering, and the inner one does a table scan, that brings no ordering.

(d) Hints

There are cases when a full plan is not needed. Given a specific query, the NC index costing could have a pessimistic view on an index, and find a full table scan better, while in fact the index is better. However, the rest of the optimizer model could apply well to the query at hand. For instance, if in the following 3-way join the optimizer believes i_c31's order is highly non-correlated to t3's storage order, it might decide to do a full scan of t3 rather than using i_c31 (that is non-covering).

```
select *
from t1, t2, t3
where c11 = c21
and c12 < c31
and c22 = 0
and c32 = 100
(g_join
(i_scan i_c22 t2)
(i_scan i_c11 t1)
(t_scan t3)
```

But if the join is such that the assumption is proven wrong, the optimizer must be instructed to use i_c31 instead. In such a case, specifying only a partial AP is both an economic and a more flexible solution. One need not be concerned by all details of the full AP for that query. Also, as data in the other tables of that query evolves, the optimal QEP could change. And, as will be seen later, one of the shortcomings of the AP is its static nature. It is possible, within the current syntax, to express just one partial plan item. In this example, this would be: $(i_{\_scan\ i\_}c31\ t3)$ However, it might be needed to express several plan fragments. For instance, if the cache is large enough, the optimizer might decide to do a full scan of the two inner tables of the join. If one wants to leave the optimizer the choice of the join order, but forbid table scans, one needs to be able to give it three hints:

```
(i_scan t1)
(i_scan t2)
(i_scan t3)
```

As a SQL query has a single associated AP, one needs a means to pack these three hints together. The hints operator allows this:

```
(hints
(i_scan t1)
(i_scan t2)
(i_scan t3)
)
```

Note that the hints AP operator is not a relational algebra operator. Its role is purely syntactic in the AP language, except for the special meaning it has with complex queries (described later).

There are no limitations on what may be given as a hint. Partial join orders may be mixedwith partial access methods. Take:

```
(hints
(g_join
(scan t2)
(scan t1)
)
(i_scan t3)
)
``` where the optimizer is instructed to put t1 inner to t2 in the join order and to use an index on t3, but it is free to fill the rest of the QEP. However, this flexibility brings the shortcoming of being able to describe inconsistent plans:

```
(hints
(g_join
(scan t2)
(scan t1)
)
(g_join
(scan t1)
(scan t2)
)
)
```

Such plans are as illegal as the one above that required the inner table of an outer join to be on the outer position of the join, an exception will be raised and the compilation will be aborted.

Other inconsistent hints will not raise an exception, but will have an undefined behavior in the initial embodiment of Ariadne:

```
(hints
(t_scan t3)
(i_scan t3)
)
```

When ASE generates and captures APs (as will be described later), it will never generate hints or partial plans. It will always generate full plans.

(e) Subquery Attachment

Subqueries are resolved in three ways in ASE:

materialization, when they are non-correlated

Part or all of the subquery is executed as an elementary join before the main query, and its results are stored in a CONSTANT node.

flattening, when a correlated subquery is connected, through a semijoin, to the main query The semijoin is implemented either as an existence join, when the subquery table is inner to its correlated table of the main query, or as a tuple filtered inner join when it is outer.

nesting

This is the SQL92 semantics of a subquery. Whenever materialization and flattening are impossible, the subquery will be executed nested in the main query, once for each outer query row. Subquery materialization will be treated below, with the complex queries. A flattened subquery is not visible anymore at the AP level, except for naming its tables, as will be seen later.

This section will focus on nested subqueries. Nested subqueries are explicitly described in the AP language, both to give their position and their own part of the QEP. The nested operator is introduced to describe items relevant to the optimizer that are inserted at a specific point in the join tree, i.e., nested over a specific derived table. The initial embodiment of Ariadne describes a single type of nested item, the nested subquery. The subq operator is introduced to describe a subquery. For example, the following SQL statement contains a correlated expression subquery, and its QEP will contain a nested subquery:

```
select *
from t1, t2
where c11 = c21
and c21 > 100
and c12 = (select c31 from t3 where c32 = t1.c11)
Its AP is:
( g_join
  ( nested
    ( i_scan 2 t1 )
    ( subq 1
      ( t_scan ( table t3 ( in ( subq 1 ) ) ) )
    )
  )
  ( i_scan 2 t2 )
)
```

Subqueries are named in the AP language with numbers, representing their syntactic order in the main query. In ASE parlance, this is the subquery number recorded in VRAGEs, SUBQNODEs, or the like. However, the AP subquery name is a well defined number, given by a statement's text and conceptually independent of the ASE implementation.

Deep subquery nesting is not described by the subquery names. Rather, the subquery name is the numbering of the subqueries in a statement, in the order of their leading opened parenthesis "(". In both examples below, the subquery containing t1 is named "1" and the subquery containing t2 is named "2":

```
select
  (select c11 from t1 where c12 = t3.c32),
  c31
from t3
where c32 > (select c22 from t2 where c21 = t3.c31)
( nested
  ( nested
    ( t_scan t3 )
    ( subq 1
      ( t_scan ( table t1 ( in_subq 1 ) ) )
    )
  )
  ( subq 2
    ( t_scan ( table t2 ( in_subq 2 ) ) )
  )
)
```

Both the subquery 1 and 2 are nested over the scan of t3.

```
select *
from t3
where c32 > (select c11 from t1
             where c12 = (select c22 from t2 where c21 = t3.c31))
( nested
  ( t_scan t3 )
  ( subq 1
    ( nested
      ( t_scan ( table t1 ( in_subq 1 ) ) )
      ( subq 2
        ( t_scan ( table t2 ( in_subq 2 ) ) )
      )
    )
  )
)
```

The subquery 2 is nested over t1's scan done in subquery 1, itself nested over the scan of t3 of the main query.

Note that the syntax of nested operator, that has the derived table as the first operand and the nested item, i.e., the subquery, as the second operand, allows an easy vertical reading of the join order and subquery placement:

```
select *
from t1, t2, t3
where c12 = 0
and c11 = c21
and c22 = c32
and 0 < (select c21 from t2 where c22 = t1.c11)
( g_join
  ( nested
    ( i_scan 3 t1 )
    ( subq 1
      ( t_scan ( table t2 ( in_subq 1 ) ) )
    )
  )
  ( i_scan 2 t2 )
  ( i_scan 3 t3 )
)
```

At a glance, the join order is t1-t2-t3, with the subquery attached over t1.

```
select *
from t1, t2, t3
where c12 = 0
and c11 = c21
and c22 = c32
and 0 < (select c31 from t3 where c31 = t1_c11
         and c32 = t2_c22)
( g_join
  ( nested
    ( g_join
      ( i_scan 3 t1 )
      ( i_scan 2 t2 )
    )
    ( subq 1
      ( t_scan ( table t3 ( in_subq 1 ) ) )
    )
  )
  ( i_scan 3 t3 )
)
```

The join order is the same, but this time the subquery is attached over the t1-t2 join.

(f) Name Conflicts

To describe a QEP, an AP needs to connect the SQL query's stored tables with relational operators. To do that, it must be able to name them in an non-ambiguous way, such that a stored table named in then AP can be linked to its occurrence in the SQL query, hence in the query tree.

Table names are the first choice for base tables. Indeed, a table name, maybe qualified by the database and owner name fully identify a table. However, a same table may occur several times in the same query:

```
select * from t1 a, t1 b
```

This case is solved by the SQL language by introducing correlation names, a and b in the example above. The most natural solution for the AP language is to use them too, whenever available. This is done by introducing the table operator, that is used whenever a base table needs to be named in an AP with more than its (potentially database and owner qualified) bare name. The AP of the query above is:

```
( g_join
  ( t_scan ( table ( a t1 ) ) )
  ( t_scan ( table ( b t1 ) ) )
)
```

Still, there are cases when correlation names are not mandatory in SQL, but the AP describing the QEP is ambiguous:

merged views flattened subqueries

In both cases, occurrences of the same base table are present in an elementary join without requiring correlation names at the SQL level.

A subquery example:

```
select *
from t1
where c11 in (select c12 from t1 where c11 > 100)
```

The in and subq AP operators are introduced to qualify the name of the table with its syntactical containment by the subquery:

```
( g_join
  ( t_scan t1 )
  ( i_scan 3 ( table t1 ( in ( subq 1 ) ) ) )
)
```

Like for the correlation case, the table notation is used. As for the views:

```
create view v1
as
select * from t1 where c12 > 100
Select t1.c11 from t1, v1
where t1.c12 = v1.c11
```

Likewise, the in and view AP operators qualify the name of the table with its syntactical containment by the view:

```
( g_join
  ( t_scan t1 )
  ( i_scan 2 ( table t1 ( in ( view v1 ) ) ) )
)
```

In general, a table may be deeply nested, for instance in a view of a subquery of a view of a view of a view of a subquery of the main query. The table name will be accordingly (and recursively) qualified with the whole chain of syntactic containment. To give a (more complex) example:

```
create view v2
as
select *
from v1
where v1.c11 in (select c12 from v1 where c11 < 0)
select *
from t1, v1, v2
where t1.c11 = v1.c12
and v1.c11 = v2.c12
and t1.c12 in (select c11 from v2)
( g_join
  ( i_scan 3 t1 )
  ( i_scan 3 ( table t1 ( in ( view v1 ) ) ) )
  ( i_scan 3 ( table t1 ( in ( view v1 ) ( view v2 ) ) ) )
  ( i_scan 2 ( table t1 ( in ( view v1 ) ( view v2 ) ( subq 1 ) ) ) )
  ( i_scan 3 ( table t1 ( in ( view v1 ) ( subq 1 ) ( view v2 ) ) ) )
  ( i_scan 3 ( table t1 ( in ( view v1 ) ( subq i ) ( view v2 ) ( subq 1 ) ) )
) )
)
```

Unions are yet another case where several occurrences of the same base table occur, but in ASE they never occur in the same elementary join. As will be seen in the next section, one uses another technique to disambiguate them.

(g) Complex Queries

All the examples above used queries that had single elementary join QEPs. However, the SQL language has statements that certain query execution engines are not capable to execute as elementary joins. This applies to ASE too, that needs to break the processing of some types of queries in several steps, and store the intermediate results in work tables or CONSTANT nodes. It is not necessary apriori to do the same with a relational algebra. One has to introduce the store operator, that materializes a derived table in a work table. But one does not need to break a formula in a sequence of steps. An algebra formula describes how to compose relations with relational operators to obtain the desired result set, but gives no information on the order of touple at the time processing.

To illustrate this, consider an AP that contains a store operator (with an optional system generated name):

```
(g_join
  (scan t1)
  (scan
    (store Worktab1
      (g_join
        (scan t2)
        (scan t3)
      )
    )
  )
)
```

This AP is perfectly compatible with both a Volcano style consumer driven dataflow engine and with a producer driven ASE engine. The difference is that while the Volcano engine will materialize late the derived table resulting form t2 and t3's join by storing it in a work table, when the top join node will ask for its first row as an inner operand, the ASE engine will materialize it early, in a first step, and only afterwards, in a second step will use it in the top join. Still, it is just a matter of convention to apply the same AP to both QEPs. One could regard the following AP, that uses the plan operator to group together several chunks of a QEP description, as a convenient, syntactic variant of the previous monolithic AP:

```
(plan
  (store Worktab1
    (g_join
```

```
        (scan t2)
        (scan t3)
      )
    )
    (g_join
      (scan t1)
      (scan (work_t Worktab1))
    )
  )
```

When using this syntax, it is mandatory to give a name to the work table. One could consider the stand-alone store operator as a macro definition introducing the worktable's name, and the work_t operator as a macro invocation of this symbol. A Volcano engine needs to add no semantic meaning to it. (Note that the work_t operator, that names the work table, also avoids any namespace conflicts between the sometimes arbitrary system generated worktable names and the base table names.) Ariadne uses this notation, and is perfectly compatible with its purely syntactic interpretation. DBMS systems that have a dataflow query engine will be able to use it as such.

However, in Ariadne's initial embodiment there is an immediate advantage in requiring such a notation whenever the QEP has several steps: one can associate AP chunks with their corresponding elementary joins. More precisely, the requirement is related not to the QEP, but to the preprocessed query tree, as this is the optimizer's input against which the AP has to be matched. The AP should have enclosed in a plan operator exactly the same number of items, and in the same order, as the CMD nodes chain in the preprocessed query tree. This way an AP to query tree match is done, and the set of tables in each AP chunk is required to be included in the set of tables of its corresponding elementary join, i.e., it is illegal to describe with an AP tables that cannot be forced into a future QEP step. For a full AP the two sets are equal, i.e., each AP chunk mentions all the tables in its corresponding CMD node, and nothing but them.

This requirement makes the match possible, whereas the monolithic AP cannot guarantee that some preestablished tree traversal gives the store operators within it in the same order as the CMD nodes chain, as the layout of the AP tree contains the optimization decisions, like the join order. To illustrate this, let us anticipate on the materialized views, and suppose ASE created the right index on the work table for the join in the main query (this is not the case):

```
    create view v4
    as
    select distinct *
    from t1, t2
    where c12 = c21
    create view v5
    as
    select distinct *
    from t2, t3
    where c22 = c31
```

Consider a first query that joins v4 work table outer to v5's one.

```
    select * from v4, v5
    where v4.c11 = 0
    and v4.c22 = v5.c21
    ( plan
      ( store Worktab1
        ( g_join
          ( 1_scan 2 ( table t1 ( in_view v4 ) ) )
          ( i_scan 2 ( table t2 ( in_view v4 ) ) )
        )
      )
      ( store Worktab2
        ( g_join
          ( t_scan ( table t2 ( in_view v5 ) ) )
          ( i_scan 2 ( table t3 ( in_view v5 ) ) )
        )
      )
      ( g_join
        ( t_scan ( work_t Worktab1 ) )
        ( i_scan ( work_t Worktab2 ) )
      )
    )
```

Then, a second one whose QEP has the opposite join order.

```
    select * from v4, v5
    where v5.c32 = 0
    and v4.c22 = v5.c21
    ( plan
      ( store Worktab1
        ( g-join
          ( t_scan ( table t1 ( in_view v4 ) ) )
          ( i_scan 2 ( table t2 ( in_view v4 ) ) )
        )
      )
      ( store Worktab2
        ( g_join
          ( i_scan 2( table t2 ( in_view v5 ) ) )
          ( i_scan 2 ( table t3 ( in_view v5 ) ) )
        )
      )
      ( g_join
        ( t_scan ( work_t Worktab2 ) )
        ( i_scan ( work_t Worktab1 ) )
      )
    )
```

Note that both QEPs create the work tables in the same order, first for v4, then for v5, actually in the main query's FROM clause order. However, the last step joins the two work tables in different orders for each query. If a monolithic AP was used, no preestablished tree traversal could give the store operators order that matches the CMD chain for both queries.

The single exception to this high level QEP perfect match requirement is when a hints operator is the AP's top operator. Such a plan will be called a hints plan, and will be associated with each CMD node of the preprocessed query tree. The UNION implementation in ASE brings an extra complication for the high level QEP structure, that will be presented later.

(h) Materialized Views

The discussion above largely illustrated materialized views. Let us however give a simpler example:

```
create view v3
as
select distinct *
from t3
select *
from t1, v3
where c11 = c31
( plan
( store Worktab1
( t_scan ( table t3 ( in_view v3 ) ) )
)
( g_join
( t_scan t1 )
( t_scan ( work_t Worktab1 ) )
)
)
```

A first step materializes the view v3 in a work table, then the second joins it with the main query table t1.

(i) Aggregates

For scalar aggregates, consider the following:

```
select max(c11) from t1
( plan
( t_scan t1 )
( )
)
```

The first step computes the scalar aggregate in a CONSTANT node. The second step is empty, as it only returns this CONSTANT, there is nothing to optimize. Other cases of empty AP parts are given below.

For vector aggregates, consider the following:

```
select max(c11)
from t1
group by c12
( plan
( store Worktab1
( t_scan t1 )
)
( t_scan ( work_t Worktab1 ) )
)
```

The first step processes the aggregate in a work table, the second scans it.

For nested aggregates (TSQL extension), consider the following:

```
select max(count(*))
from t1
group by c11
( plan
( store Worktab1
( i_scan 2 t1 )
)
( t_scan ( work_t Worktab1 ) )
( )
)
```

The first step processes the vector aggregate into a work table, the second scans it to process the nested scalar one into a CONSTANT node, the third step returns this CONSTANT.

For extended columns aggregates (TSQL extension), consider the following

```
select max(c11), c11
from t1
group by c12
( plan
( store Worktab1
( t_scan t1 )
)
( g_join
( t_scan t1 )
( i_scan 1 ( work_t Worktab1 ) )
)
)
```

The first step processes the vector aggregate, the second one joins it back to the main query table to process the extended columns.

For aggregates in merged views, consider the following:

```
create view v6
as
select max(c11) as c61, c12 as c62
from t1
group by c12
select * from t2, v6
where c21 = 0
and c22 > c61
( plan
( store Worktab1
( t_scan ( table t1 ( in_view v6 ) ) )
)
( g_join
( i_scan 2 t2 )
( t_scan ( work_t Worktab1 ) )
)
)
```

The first step processes the vector aggregate, the second joins it to the main query table.

For aggregates in materialized views, consider the following:

```
create view v7
as
select distinct max(c11) as c71, c12 as c72
from t1
group by c12
select * from t2, v7
where c21 = 0
and c22 > c71
( plan
( store Worktab1
( t_scan ( table t1 ( in_view v7 ) ) )
)
( store Worktab2
( t_scan ( work_t Worktab1 ) )
)
( g_join
( i_scan 2 t2 )
( t_scan ( work_t Worktab2 ) )
)
)
```

The first step processes the vector aggregate in a first work table, the second step scans it in a second work table to process the materialized view, the third step joins this second work table in the main query. Note en passant that ASE is not smart enough to notice that v7's result set is guaranteed to be distinct, so v7 could be merged.

(j) Materialized Subqueries

Flattened and nested subqueries were already exposed in previous sections. A non-correlated subquery will be completely materialized:

```
select *
from t1
where c11 = (select count(*) from t2)
( plan
( i_scan 3 ( table t2 ( in_subq 1 ) ) )
( i_scan 2 t1 )
)
```

The first step executes the scalar aggregate non-correlated subquery. The second one uses the result in scanning t1. Non-correlated parts of a correlated subquery could be materialized, while the correlated remaining part is flattened or nested:

```
select *
from t1
where c11 in (select max(c21)
from t2
group by c22)
( plan
( store Worktab1
( t_scan ( table t2 ( in_subq 1 ) ) )
)
( g_join
( t_scan t1 )
( t_scan ( work_t Worktab1 ) )
)
)
```

The first step executes the vector aggregate processing of the subquery, that is non-correlated, and stores it into a work table. The second semijoins it to t1.

(k) Reformatting

Reformatting is the optimizer decided materialization of a derived table, with the restriction that it cannot be the result of a join. Assume t2 has no index at all and is very

```
select *
from t1, t2
where c11 > 0
and c12 = c21
and c22 = 0
( g_join
(t_scan t1
(scan
(store Worktab1
(t_scan t2)
)
)
)
```

Worktab1 is an optimizer generated work table, that is not visible as a CMD node in the optimizer's input, the preprocessed query tree. This is the single case when the store operator is not the operand of a plan operator. Indeed, the exact match requirement between the plan operands and the CMD nodes sequence requires the store operator to be the operand of a scan operator. This is very opportune, as such an AP pattern may unambiguously identify the ASE reformatting.

(l) OR Strategy

The OR strategy was purposely left out of the initial embodiment of Ariadne. In a relational algebra, the OR strategy would be naturally described by the scan_rid and rid_join operators:

```
(rid_join
(union
(scan_rid i_i t1)
(scan_rid i_2 t1)
...
(scan_rid i_n t1)
)
t1
)
```

There were no cycles for the extra work to generate and apply this syntax. Note also the difficulty raised by the different meaning the union operator has at the ASE high level QEP structure.

(m) Unions

The ASE implementation of UNION brings an extra complication of the high level structure of the AP language. To match the UNION/CMD structure of a preprocessed query tree, a union operator was introduced in AP. In the initial embodiment of Ariadne, the union operator is restricted to the top of the AP, as is the UNION query tree node. However, this limitation can be readily raised, as desired, and the same notation can be used with engines where union is a regular binary relational operator. The UNION ALL is well described by the union AP operator:

```
select * from t1
union all
select * from t2
( union
( t_scan t1 )
( t_scan t2 )
)
```

This is not true for UNION, that accumulates results in a work table, then sorts it to eliminate duplicates.

```
select * from t1
union
select * from t2
```

There is no 1—1 correspondence between the UNION nodes in the query tree and the operands of the UNION operator, as the sort is visible as an UNION node and the work table is exposed. The AP that would match the query tree is non-intuitive with respect to the logical UNION semantics:

```
( union
( store Worktab1
( t_scan t1 )
)
( store Worktab1
( t_scan t2 )
)
( t_scan ( work_t Worktab1 ) )
)
```

So, the AP of both UNION and UNION ALL are the same:

```
( union
  ( t_scan t1 )
  ( t_scan t2 )
)
```

(n) DISTINCT and ORDER BY Clauses

The initial embodiment of Ariadne does not describe sort operators. The optimizer is responsible to handle them.

(o) Empty Plans

TSQL introduces a flavor of SELECT statement that has no FROM clause: select 1, 2
Such statement is not optimized, hence it is AP will be empty. Empty APs are discarded. There are exceptions though, when some steps of the QEP are not optimized, while others are. The reader has already seen an example with scalar aggregates. The same can happen with unions:

```
select * from t1
union
select 1, 2
( union
  ( store Worktab1
    ( t_scan t1 )
  )
  ( )
  ( t_scan ( work_t Worktab1 ) )
)
```

The second step of the QEP, corresponding to the constant SELECT statement, is empty.

(p) Properties

All forced options are added to the AP language, as properties.

3. Instructing the Server to Capture and Apply Abstract Plans

In the previous section it was stated that some deus ex machina association between an AP and its corresponding query is possible. Let us now see how an abstract plan is actually associated with its query, and how abstract plans can be produced. An AP is always associated to an individual DML statement, through the statement's text. One can think of this process as an exact textual match, i.e., that the APs and the SQL text of their associated statement form pairs that are stored in some associative memory, with the statement's text as key. When the AP association mode is on, all incoming DML statements are searched for in this memory. If a pair is found whose SQL text matches the SQL text of the incoming statement, then the AP of that pair will be the associated one.

The associative memory is a new per database system catalog, called SYSQUERYPLANS. The match is actually smarter than the exact textual identity. In general, there are whole groups of statements that have the same AP. Ideally one should store just one pair for each such group, with the association key transformed into some canonical form, and recognize each statement in the group as matching this stored canonical form. The larger the groups, the better the usage of the associative memory, as the lesser the paris to store for a given set of statements, and as the access performance of associative memories generally decreases with their size. There is a slight complication though: the QEP of a statement depends on the cardinalities and values distributions of the scanned data. So will the AP. Hence not only will it be impossible to find an ideal transformation (as described above) that applies to all server installations, but also such an ideal transformation will have to vary in time, as in general the QEPs of queries issued on a single server vary in time when data changes.

One shall be thus less ambitious and look, below the ideal level, for a practical solution. For some set of statements and its ideal partitioning according to their APs on some given data layout, two statements in the same group fall actually in one of the two following cases:

either they can be proved to always be in the same group, irrespective to the actual data or they are contingently in the same group, but for some other data layout they would not A basic example of the first kind are the SQL statements that have the same sequence of tokens, but differ in whitespace. The initial embodiment of Ariadne focuses on such a partition of the set of statements to be associated to APs. The match will be thus done on the whitespace filtered SQL statement text.

A second point to consider is the creation of APs. In general, a user is able to enter a hand crafted one for a specific query, but this is tendios for the brute force approach, when large amounts of APs must be stored. An exclusively manual solution would also increase the probability of errors. To solve this, the system may be instructed to automatically capture an AP and its corresponding query, as it executes it. With the exception of the per query explicit AP inclusion in the statement text (described later), the association and capture mechanisms rely on the notion of AP group. An AP group is a named set of APs that can be used either to associate or to capture the AP of a query. For a given statement, at a given moment, there are two relevant AP groups:

the input, or association group he output, or capture group.

For a given statement, at a given moment, there are two relevant AP modes:

the load, or association mode the dump, or capture mode and a sub-mode of the capture mode:

the replace sub-mode

Either of the AP association mode or the AP capture mode can be inactive, in which case no action is performed, or active from/to a specific named AP group.

When the association mode is active, then the statement's AP is searched in the corresponding AP group. If it is found, it is directives are applied to influence the optimization process. If not, the regular optimization is performed. When the capture mode is active, then, after the optimization, the AP describing the QEP of the statement is generated, then saved in the corresponding AP group. The group is first searched for an existing AP with the same association. If such an AP is not found or if the replace sub-mode is on, then the new AP is stored, deleting the conflicting one, if any. If such an AP is found and the replace sub-mode is not on, than the new AP is thrown away. It is legal to enable at the same time both the association and the capture modes, either with the same group or with two different ones. Both the capture and the application of the AP will be presented at three granularity levels:

individual queries all queries issued on a given connection the whole server (a) Per Query The individual query is the finest granularity at which a plan may be associated with a SQL statement. There are cases when a partial AP instructs he optimizer only on parts of a query, but the matching between AP items and statement items not part of the association process per se, it is part of the AP application, that is possible only after an AP was associated to a query.

Individual queries cannot have the association or capture mode enabled without changing their statement text. This can however be simulated with the per connection solution (described below) where the active association group has only a single query, or with the execution of a single query bracketed by the enabling/disabling of the capture mode.

When it is acceptable to modify the statement's text, and for the purpose of experimentation with queries and APs, a new plan clause was added to all optimizable statements. For instance, to affect the join order of a specific SELECT statement:

```
select *
from t1, t2
where c12 = c21
plan '(g_join (scan t2) (scan t1))'
```

Likewise, to force the access method of a subquery in a WHILE statement:

```
wile exists (select * from t1 where c11 > 0)
   plan '(t_scan (table t1 (in (subq 1))))'
```

Or in a RETURN statement:

```
return (select count(*) from t1 where c11 > 0)
   plan '(t_scan (table t1 (in (subq 1))))'
```

The plan clause may be also used to enable the association or capture mode for an individual plan, from/to a given group:

```
select *
from t1, t2
where c12 = c21
plan dump my_group
select *
from t1, t2
where c12 = c21
plan replace another_group
select *
from t1, t2
where c12 = c21
plan load my_group
```

Unlike when including the explicit AP in the statement, for this flavor of the plan clause the regular association and capture mode, described above are used. It is also legal not to give any group name:

```
select *
from t1, t2
where c12 = c21
plan dump
select *
```

```
from t1, t2
where c12 = c21
plan load
```

In these cases, the two default AP groups are used. There are two predefined AP groups, ap_stdin and ap_stdout, that are used whenever the association or capture mode are active but no explicit group was named. To store a given plan, a combination of the two flavors of the plan close can be used:

```
select *
from t1, t2
where c12 = c21
plan '(g_join (scan t2) (scan t1))' dump my_plans
```

It is illegal, however, to both request the association from some input group and explicitly give an AP.

(b) Per Connection

The most common style of using Abstract Plan is at the connection level. A user may explicitly enable or disable either or both of the association and capture mode with a new SET PLAN statement. For instance:

```
set plan load 'my-plans' on
``` uses the LOAD keyword to enable the association mode for all the subsequent queries of this connection, while:

```
set plan load off
``` to disable it.

Likewise, the DUMP and REPLACE keywords enable/disable the capture mode, and its replace sub-mode.

The AP mode setting is done at the execution of the SET PLAN statement, and becomes active for subsequent batches. For example, in:

```
set plan load 'my-plans' on
select * from t1
go
select * from t1
go
``` the AP will be searched only for the query in the second batch.

While enabled, the mode is active in the current database and any subsequently used databases. APs are saved in the SYSQUERYPLANS system catalog of the current database, irrespective of the databases of the tables in the queries. For instance, in:

```
use db1
go
set plan dump 'new_plans' on
go
select * from t1
```

```
select * from db2 . . t1
go
use db2
go
select * from t1
select * from db1 . . t1
go
``` the first two queries are saved in db1.dbo.SYSQUERYPLANS, while the last two ones in db2.dbo.SYSQUERYPLANS. The connection level settings may be overridden by a statement level plan clause:

```
set plan dump 'new_plans' on
go
select * from t1
select * from t1 plan dump 'other_plans'
go
```

The AP of the first query is captured in the group called newplans, while the AP of the second query in otherplans.

(c) Per Server

There are cases when the whole server must be put in capture or association mode. For such cases, there are three trace flags that turn on/off the association, capture and replace modes: 371, 372 and 373. When the AP modes are enabled through trace flags, no group name can be given. Hence, the corresponding default groups are used. Again, the server wide modes may be overridden by either per connection or per query settings.

4. Managing Abstract Plans

Except for enabling and disabling AP modes, AP administration involves creating, renaming, copying and deleting AP groups and individual APs. There are new utility statements and stored procedures for that.

(a) Abstract Plan Groups

As already stated, there are two predefined AP groups, ap_stdin and ap_stdout. Both may be explicitly used either to associate or to capture plans. When some mode is active but no group name was given, then the association will implicitly use ap_stdin and the capture ap_stdout. It is useful to create new AP groups. The sp_add_qpgroup system stored procedure does this:

```
sp_add_qpgroup new_group
``` creates a new AP group with the given name new_group and the next available GID. Once created, an AP group may be renamed or dropped:

```
sp_rename_qpgroup new_group, another_name
sp_drop_qpgroup another_name
``` first renames the AP group to another_name, then drops it. A group must be empty to be dropped. If there are plans in the group, they must be deleted first:

```
sp_delete_all_qplans my_group
```

Also, all APs of a group may be copied into another one:

```
sp_copy_all_qplans src_group, dest_group
```

The xxx_all_qplans stored procedures act on all APs of the current user, in the given AP group and the current database. It is also desirable to transfer APs between users, databases and servers. For this, an AP group (corresponding to some user and the current database) is exported first as an user table:

```
use db1
go
sp_export_qpgroup usr1, group1, tmpdb . . my_export
```

Then, if needed, the table may be transferred to another server. Finally, it can be imported back, potentially in another database and for another user, as a new AP group:

```
use db2
go
sp_import_qpgroup tmpdb . . my_export, usr2, group2
```

For the management of AP groups, tools to inspect their contents are also needed. The sp_help_qpgroup system stored procedure gives the summary of all AP groups in that current database, or details on some specific AP group. For instance:

```
1> sp_help_qpgroup
2> go
Query Plan Groups in test
Group              GID         Plans
-----------------  ----------  ----------
first              1           92
second             2           0
sprocs             3           0
(return status = 0)
lists all AP groups, while:
1> sp_help_qpgroup first
2> go
Group first, gid 1
Total Rows Total QueryPlans
-----------  -----------
231          92
Number of query plans per row count
Rows         Plans
-----------  -----------
6            3
5            3
4            3
3            20
2            63
Plans with most rows
Rows         Plan
6            376388410
6            408388524
6            424388581
5            344388296
5            360388353
```

```
    5 392388467
    4 584389151
    4 648389379
    4 1371867954
    Hashkeys
    -----------
    92
    No hash collision
    (return status = 0)
``` gives a summary of the first AP group.
More detailed information may be obtained:

```
1> sp_help_qpgroup first, list
2> go
Group first, gid 1
Total Rows Total QueryPlans
----------- ----------------
231 92
Plans
hashkey id query plan
----------- ----------- -----------------------
85780 2059870405 else select Column_n. . . ( t_scan #helptype ). . .
39800918 1771869379 select sum(c1) from. . . ( plan ( store Wor. . .
39809110 1755869322 select sum(c1) from. . . ( plan ( store Wor. . .
50610285 696389550 select c11 from t1 w. . . ( nested ( t_scan . . .
74007351 2123870633 select Parameter_nam. . . ( t_scan #helpproc ) . . .
87771942 1931869949 select Type_name = s. . . ( g_join ( t_scan . . .
117968930 376388410 else select keytype . . . ( g_join ( t_scan . . .
. . . . . .
```

Finally, a basic comparison of the contents of two AP groups is given by

```
            sp_cmp_all_qplans:
            sp_cmp_all_qplans my_group, your_group
``` will report APs different in the two groups, and APs that are too complex and need to be checked by the user.
(b) Individual Abstract Plans As already seen, individual APs may be created with the plan clause added to the query syntax. It might be, however, desirable to create an AP with the query text given as a string rather than as an actual statement to be executed. The CREATE PLAN statement does this:

```
            create plan "select * from t1" "(t_scan t1)"
``` will capture in the group currently active (or in ap_stdout if none) a new AP, associated by the explicitly given query text. Fine grained administration system stored procedures allow to drop, copy, display or find an individual AP.

```
1> sp_find_qplan "%in (select c11 from t1%"
2> go
gid id
text
----------- -----------
1 664389436
select * from t1 where C11 in (select c11 from t1 where c12 in
(select c21 from t2 where c22 = t1.c11) and c12 in
(select c32 from t3 where c31 = t1.c11)
```

```
(1 row affected)
(return status = 0)
1> sp_help_qplan 664389436
2> go
gid hashkey id
----------- ----------- -----------
1 728445970 664389436
query
-------------------------------------------------------------------------
---
select * from t1 where c11 in (select c11 from t1 where c12 in (select c21
. . .
plan
-------------------------------------------------------------------------
---
( g_join
( t_scan t1 )
( i_scan 2 ( table t1 ( in ( subq 1 ) ) ) )
( . . .
(return status = 0)
1> sp_help_qplan 664389436, full
2> go
gid hashkey id
1 728445970 664389436
query
select * from t1 where c11 in (select c11 from t1 where c12 in (select c21
from t2 where c22 = t1.c11)) and c12 in (select c32 from t3
where c31 = t1_c11)
plan
( g_join
( t_scan t1 )
( i_scan 2 ( table t1 ( in ( subq 1 ) ) ) )
( i_scan 3 ( table t2 ( in ( subq 2 ) ) ) )
( i_scan 3 ( table t3 ( in ( subq 3 ) ) ) )
)
(return status = 0)
```

The AP with ID 664389436 is searched, found and displayed.

```
            sp_copy_qplan 664389436, new_group
            sp_drop_qplan 664389436
```

Then it is copied into a new AP group (as a new AP, with a new ID) and finally deleted.
(c) The Low Cardinality AP Group Cache A final consideration is due related to the surgical strike style. The association mode catalog lookup overhead is generally compensated, when the AP is found, by the reduction of the optimization time. However, when few queries actually have an AP (i.e., when APs are used in the surgical strike rather than in the brute force style), the cost of the lookup is still payed by all queries. It would be desirable to avoid such an overhead. To solve this issue, a sub-mode was introduced for the association mode: the low cardinality AP group cache check sub-mode of the LOAD mode.

The low cardinality AP group cache is a main memory per connection cache that holds the hash keys of all SQL statements (i.e., queries) that have an AP stored in the active association group. This cache has a limited number of entries: maximum 20. It can be enabled only when there are no more than 20 distinct hash keys in the active association group, i.e., when that AP group has a low cardinality, that is perfectly compatible with the surgical strike style of AP usage. The actual <query text; AP text> are not cached; they must still be looked up on disk on a cache hit. It is not the hits that save time, and it would be wrong to use this sub-mode when there are many APs in the active association group, hence the limitation to 20, that also allows very low overhead cache probing. It is the misses that actually save time, as a catalog lookup would be useless when the cache probe fails: if the hash key is not in the cache, it is surely not in the catalog either.

This sub-mode is enabled with:

```
set plan exists check on
``` and disabled with:

```
set plan exists check off
``` or when the LOAD mode is disabled itself.

5. A Case Study: Smooth Upgrades

Let us now analyze how this novel feature can be used in one of the hardest DBA tasks: making a smooth upgrade to a new ASE version. There are risks when upgrading to an ASE version whose optimizer has changes with respect to the current one. As already exposed, some queries that were either well described by the old optimizer, or got a good QEP by chance, can become with the new optimizer the exceptions for which a non-optimal QEP is generated.

The wrong plan is caused either by preprocessing changes, or by optimization changes. Let us describe an upgrade procedure that overcomes both types of issues. Before the upgrade, an AP group is created:

```
sp_add_qpgroup before_group
```

Massive AP capture mode is enabled, either per connection or per server (depending on the usage of ASE):

```
set plan dump before_group on
```

The server is run in this mode for some relevant period of time (depending on the usage of ASE this could be a couple of hours, a day, a week, or several such intervals). Once all relevant plans are captured:

```
select count(*) from sysqueryplans where
    gid = <the GID of before_group>
``` the above count becomes stable. Then, the upgrade to the new ASE version is done. The new binary is run, with both AP modes disabled. In most cases all is OK and the before_group AP group can be either dropped or archived pro memoria.

However, if performance is worse, the AP feature is needed. First, a new AP group is created and the new APs are captured therein:

```
sp_add_qpgroup after_group
set plan dump after_group on
```

This allows to identify, later, the offending queries. Depending on the production constraints, more or less time should be used for the new capture. But even with a little time the offending queries will be caught; they were surely run as the performance regression was experienced. If a little time is dedicated to this new capture, potentially not all offending queries will be caught. In such a case, these step should be reiterated whenever, later, new performance regressions surface. Then, the massive AP usage is enabled, using the pre-upgrade APs:

```
set plan dump off
set plan load before_group on
```

Hopefully, the desired performance level is obtained. There could still be offending queries: the ones that regress due to preprocessing changes for some queries, changes that are incompatible with the corresponding pre-upgrade APs. If this happens, a third AP group must be created and APs saved again, keeping the old APs usage on:

```
sp_add_qpgroup using_group
set plan dump using_group on
```

The after_group, and if needed, the using_group AP groups are then compared to the before_group:

```
sp_cmp_all_qplans before_group, after_group
sp_cmp_all_qplans before_group, using_group
```

This allows to identify the two classes of offending queries:
- the ones for which the optimizer took a different decision
- the ones for which the preprocessor took a different decision Running by hand these queries identifies the slow queries and narrows down the sets to:
- the ones for which the optimizer took the wrong decision
- the ones for which the new preprocessor decision is incompatible with the old AP A forth AP group is created:

```
sp_add_qpgroup temp_group
```

The APs of all offending queries in the first class are copied as such in temp_group. A better AP is hand crafted and created into temp_group for the offending queries in the second class.

This AP group will be used until Sybase TS and engineering solves the optimizer issues: set plan load off

```
set plan load temp_group on
```

The expectation is that the process above is reasonable fast, even in the more complex case of preprocessor induced regressions, and that under the temp_group association mode the right performance level is obtained. Finally, Sybase TS and engineering delivers a fixed binary, and possibly a last AP group, cruise_group, containing the optimal plans for the queries that just do not fit within the new optimizer model.

The expectation is that in most cases there will be no need for the cruise_group. However, this is the least bad solution in the rare cases when the performance regression is not a bug but an unhappy correlation between the new optimizer model, some queries and the data layout. The alternatives to the cruise_group solution are:

modify the query's semantics to fall within the new optimizer model modify the query syntax to add some forced options live with bad performance To summarize, to make smooth upgrades, AP should give the best short term solution in most cases, and the least bad a la longue solution in some isolated cases.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. In a computer system having a processor, a memory, and a storage device, said storage device storing a database comprising rows of data records, each data record storing information in database columns, said database including an optimizer for selecting a query execution plan specifying how a given database query is executed, a method for executing a database query for selecting particular ones of said data records, the method comprising:

(a) receiving from a user specification of a database query specifying selection of particular ones of said data records, said database query comprising an expression specifying a query condition;

(b) providing a language interface to the optimizer, through which it can be given a user-provided description of a particular desired query execution plan for said specified database query;

(c) through said language interface, receiving from the user specification of the desired query execution plan for said specified database query, the language interface defining a declarative language syntax that allows description of the desired query execution plan in abstract terms, said specification of the desired query execution plan comprising a relational algebra describing the desired execution plan for said specified database query without specifying a particular sequence of operations that the database system must follow;

(d) storing said specified desired query execution plan as a reusable object; and (e) when executing said database query, performing substeps of:

(i) retrieving said specified desired query execution plan; and (ii) executing said database query according to the query execution plan set forth in said retrieved specified desired query execution plan.

2. The method of claim 1, wherein said user-provided description of a desired query execution plan comprises an abstract plan allowing cost-based optimization decisions to be turned into reusable objects.

3. The method of claim 2, wherein said abstract plan provides a description of a particular query execution plan that is desired.

4. The method of claim 1, wherein the method operates to prevent performance regression resulting from a system upgrade.

5. The method of claim 1, wherein the method operates to support query optimization fine tuning.

6. The method of claim 1, wherein said user-provided description is not syntactically included in said database query.

7. The method of claim 1, wherein said language interface supports specification of a partial query execution plan.

8. The method of claim 7, wherein a partial query execution plan employs logical operators to specify query execution.

9. The method of claim 1, wherein said language interface supports specification of a full query execution plan.

10. The method of claim 9, wherein a full query execution plan employs physical operators to specify query execution.

11. The method of claim 1, wherein said language interface supports specification of decisions that the optimizer may not take to create the query execution plan.

12. The method of claim 1, further comprising:

upon receipt of the database query, associating the database query with a previously-stored query execution plan.

13. The method of claim 12, wherein said associating step is based, at least in part, on text which comprises the database query.

14. The method of claim 1, wherein the query execution plan is compliant with the user-provided description.

15. The method of claim 1, wherein said specification of the desired query execution plan comprises relational algebra expressions that are not syntactically included in the database query.

16. The method of claim 1, wherein said specification of the desired query execution plan comprises relational algebra expressions that are stored in a system catalog.

17. The method of claim 1, wherein said language interface includes specification of a high level join operator.

18. The method of claim 1, wherein said language interface includes specification of a union operator.

19. The method of claim 1, wherein said language interface includes specification of a scan operator.

20. The method of claim 1, wherein said language interface includes specification of a store operator.

21. The method of claim 1, wherein said language interface includes specification of a nested operator.

22. The method of claim 1, wherein said language interface includes logical operators that allow the optimizer freedom to choose access methods for executing the database query.

23. The method of claim 1, wherein said language interface includes physical operators that do not allow the optimizer freedom to choose access methods.

24. A database system comprising:

a database storing database records and including an optimizer for selecting a query execution plan specifying how a given database query is executed;

a language interface, in communication with the optimizer, through which a user-provided description of a particular high level query execution plan may be specified, the language interface defining a declarative language syntax that allows description of a query execution plan in abstract terms, said declarative language syntax allowing description of the query execution plan without specifying a particular sequence of operations that the database system must follow; and a module for storing the high level query execution plan as a reusable object, wherein said database system executes the database query according to the stored high level query execution plan.

25. The system of claim 24, wherein said user-provided description of a desired query execution plan comprises an abstract plan allowing cost-based optimization decisions to be turned into reusable objects.

26. The system of claim 25, wherein said abstract plan provides a description of a particular query execution plan that is desired.

27. The system of claim 24, wherein the system operates to prevent performance regression resulting from a system upgrade.

28. The system of claim 24, wherein the system operates to support query optimization fine tuning.

29. The system of claim 24, wherein said user-provided description is not syntactically included in said database query.

30. The system of claim 24, wherein said language interface supports specification of a partial query execution plan.

31. The system of claim 30, wherein a partial query execution plan employs logical operators to specify query execution.

32. The system of claim 24, wherein said language interface supports specification of a full query execution plan.

33. The system of claim 32, wherein a full query execution plan employs physical operators to specify query execution.

34. The system of claim 24, wherein said language interface supports specification of decisions that the optimizer may not take to create the query execution plan.

35. The system of claim 24, further comprising:
 a module that associates the database query with a previously-stored query execution plan.

36. The system of claim 35, wherein associating a database query with a previously-stored query execution plan is based, at least in part, on text which comprises the database query.

37. The system of claim 24, wherein the query execution plan is compliant with the user-provided description.

38. The system of claim 24, wherein specification of a desired query execution plan comprises relational algebra expressions that are not syntactically included in the database query.

39. The system of claim 24, wherein specification of a desired query execution plan comprises relational algebra expressions that are stored in a system catalog.

40. The system of claim 24, wherein said language interface includes specification of a high-level join operator.

41. The system of claim 24, wherein said language interface includes specification of a union operator.

42. The system of claim 24, wherein said language interface includes specification of a scan operator.

43. The system of claim 24, wherein said language interface includes specification of a store operator.

44. The system of claim 24, wherein said language interface includes specification of a nested operator.

45. The system of claim 24, wherein said language interface includes logical operators that allow the optimizer freedom to choose access methods for executing the database query.

46. The system of claim 24, wherein said language interface includes physical operators that do not allow the optimizer freedom to choose access methods.

* * * * *